(12) United States Patent
Hida et al.

(10) Patent No.: US 7,936,146 B2
(45) Date of Patent: May 3, 2011

(54) MOTOR CONTROL DEVICE

(75) Inventors: Hajime Hida, Hirakata (JP); Shunya Sakamoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 364 days.

(21) Appl. No.: 12/101,707

(22) Filed: Apr. 11, 2008

(65) Prior Publication Data

US 2008/0252250 A1    Oct. 16, 2008

(30) Foreign Application Priority Data

Apr. 13, 2007  (JP) ................................ 2007-106024
Apr. 3, 2008   (JP) ................................ 2008-097168

(51) Int. Cl.
*H02P 27/06* (2006.01)
(52) U.S. Cl. ......... 318/801; 318/800; 318/799; 318/798
(58) Field of Classification Search ................. 318/801, 318/800, 799, 798
See application file for complete search history.

(56) References Cited

U.S. PATENT DOCUMENTS

| 6,700,343 B2 * | 3/2004 | Masaki et al. | 318/434 |
| 6,844,697 B2 * | 1/2005 | Masaki et al. | 318/721 |
| 7,030,589 B2 * | 4/2006 | Kaneko et al. | 318/400.02 |
| 7,075,266 B2 * | 7/2006 | Tobari et al. | 318/400.02 |

FOREIGN PATENT DOCUMENTS

| JP | 02-197295    | 8/1990 |
| JP | 2003-189670  | 7/2003 |
| JP | 2003-224982  | 8/2003 |
| JP | 2004-064903  | 2/2004 |
| JP | 2004-104977  | 4/2004 |
| JP | 2005-045848  | 2/2005 |

OTHER PUBLICATIONS

Hida et al., "Position Sensorless Vector Control for Permanent Magnet Synchronous Motors Based on Maximum Torque Control Frame", Collection of the Lecture Treatises, 2006. Presented at the 2006 Annual Conference of the Industry Applications Society of the Institue of Electrical Engineers of Japan; pp. 385-388 (I-385-I-388); Aug. 2006.

* cited by examiner

*Primary Examiner* — Bentsu Ro
*Assistant Examiner* — David S Luo
(74) *Attorney, Agent, or Firm* — NDQ&M Watchstone LLP

(57) ABSTRACT

A motor control device has: a motor current detecting portion for detecting, based on a current flowing between an inverter and a direct-current power supply, a motor current flowing through a three phase motor; a specified voltage value producing portion for producing a specified voltage value based on the motor current; a specified voltage value holding portion for holding an earlier specified voltage value outputted from the specified voltage value producing portion; and a specific period setting portion for setting a specific period based on a voltage difference between two of U-phase, V-phase, and W-phase voltages. Outside the specific period, the motor is controlled based on the specified voltage value outputted from the specified voltage value producing portion, and, within the specific period, the motor is controlled based on the specified voltage value held by the specified voltage value holding portion.

11 Claims, 16 Drawing Sheets

| U | V | W | BUS CURRENT |
|---|---|---|---|
| L | L | L | - |
| L | L | H | w |
| L | H | L | v |
| L | H | H | -u |
| H | L | L | u |
| H | L | H | -v |
| H | H | L | -w |
| H | H | H | - |

DETECTED PHASE CURRENT

|  | T1 | T2 | T3 | MODE | T1-T2 | T2-T3 |
|---|---|---|---|---|---|---|
| $v_u > v_v > v_w$ | CntW | CntV | CntU | 1 | -w | u |
| $v_v > v_u > v_w$ | CntW | CntU | CntV | 2 | -w | v |
| $v_v > v_w > v_u$ | CntU | CntW | CntV | 3 | -u | v |
| $v_w > v_v > v_u$ | CntU | CntV | CntW | 4 | -u | w |
| $v_w > v_u > v_v$ | CntV | CntU | CntW | 5 | -v | w |
| $v_u > v_w > v_v$ | CntV | CntW | CntU | 6 | -v | u |

SAMPLING TIME POINT
    ST1:T1-T2
    ST2:T2-T3

MOTOR CONTROL DEVICE

This nonprovisional application claims priority under 35 U.S.C. §119(a) on Patent Applications Nos. 2007-106024 and 2008-097168 filed in Japan on Apr. 13, 2007 and Apr. 3, 2008 respectively, the entire contents of which are hereby incorporated by reference.

BACKGROUND OF THE INVENTION

1. Field of the Invention

The present invention relates to motor control devices that drive and control a motor.

2. Description of Related Art

In order to perform vector control of a motor by supplying three-phase alternating-current power to the motor, it is necessary to detect two phase currents (for example, a U-phase current and a V-phase current) among three phase currents consisting of U-phase, V-phase, and W-phase currents. In general, detection of two phase currents is performed by using two current sensors (such as current transformers). However, the use of two current sensors undesirably increases overall cost of a system incorporating the motor.

It is for this reason that there has conventionally been proposed a technique by which a bus current (direct current) between an inverter and a direct-current power supply is detected with a single current sensor, and, based on the bus current thus detected, two phase currents are detected. This technique is called a single shunt current detection technique.

FIG. 19 is an overall block diagram showing a conventional motor drive system employing the single shunt current detection technique. An inverter (PWM inverter) 902 includes three half-bridge circuits provided one for each of three phases and each having an upper arm and a lower arm. The inverter 902 performs individual switching of each arm in accordance with specified three-phase voltage values fed from a controller 903, and thereby converts a direct-current voltage from a direct-current power supply 904 into a three-phase alternating-current voltage. The three-phase alternating-current voltage thus obtained is supplied to a three-phase permanent-magnet synchronous motor 901 to drive and control the motor 901.

A line connecting each lower arm provided in the inverter 902 with the direct-current power supply 904 is called a bus $M_L$. A current sensor 905 transmits, to the controller 903, a signal indicating a bus current flowing through the bus $M_L$. The controller 903 performs sampling of an output signal of the current sensor 905 with appropriate timing, and thereby detects a phase current of a phase with a maximum voltage level (maximum phase) and a phase current of a phase with a minimum voltage level (minimum phase), namely, two phase currents.

If there is a sufficient level difference among the voltage levels of different phases, two phase currents can be detected in the above-described manner. However, if the voltage levels of the maximum phase and intermediate phase come close to each other, or the voltage levels of the minimum phase and intermediate phase come close to each other, it becomes impossible to detect two phase currents. Incidentally, the single shunt current detection technique will be described later with reference to FIG. 3 to FIGS. 5A to 5D, along with the reason why it becomes impossible to detect two phase currents.

In view of this, there has been proposed a technique of correcting the pulse width of a PWM signal for each arm provided in the inverter based on the three-phase gate signals in the time period during which two phase currents cannot be detected by the single shunt current detection technique.

As an example of such a correction technique, FIG. 20 shows an example of how to correct a specified voltage value (pulse width) in general. In FIG. 20, the horizontal axis represents time, and reference characters 920$u$, 920$v$, and 920$w$ represent the voltage levels of the U-phase, the V-phase, and the W-phase, respectively. Since the voltage level of each phase is commensurate with the specified voltage value (pulse width) for each phase, they can be considered equivalent. As shown in FIG. 20, the specified voltage value (pulse width) of each phase is corrected in such a way that a difference between the voltage levels of the "maximum phase and intermediate phase" and a difference between the voltage levels of the "minimum phase and intermediate phase" do not become equal to or smaller than a predetermined value. With this correction, it becomes possible to detect two phase currents with stability. However, as a result of the specified voltage value (pulse width) being corrected, as shown in FIG. 20, distortion of the phase voltage occurs, leading to an undesirable increase in noise and vibration.

It is for this reason that a technique of handling the time period during which two phase currents cannot be detected without correcting the specified voltage value (pulse width) is sought after.

For example, there has been proposed a method for estimating three-phase currents by re-converting d-q axes currents into three-phase currents in the time period during which two phase currents cannot be detected, the d-q axes currents obtained by performing dq conversion on the three-phase currents obtained before that time period.

There has also been proposed a method for allowing the carrier frequency of the PWM inverter to be changed, and reducing the carrier frequency as necessary for making it possible to detect two phase currents. The drawback of these conventional methods, however, is a complicated calculation process that they require.

SUMMARY OF THE INVENTION

According to one aspect of the present invention, a motor control device is provided with: a motor current detecting portion for detecting, based on a current flowing between an inverter that drives a three-phase motor and a direct-current power supply, a motor current flowing through the motor; a specified voltage value producing portion for producing, based on the motor current, a specified voltage value as a target value for a voltage to be applied to the motor, and outputting the specified voltage value thus produced; a specified voltage value holding portion for holding an earlier specified voltage value outputted from the specified voltage value producing portion; and a specific period setting portion for setting a specific period based on a voltage difference between two of U-phase, V-phase, and W-phase voltages of the motor. Outside the specific period, the motor is controlled via the inverter based on the specified voltage value outputted from the specified voltage value producing portion, and, within the specific period, the motor is controlled via the inverter based on the specified voltage value held by the specified voltage value holding portion.

Specifically, for example, the specific period setting portion includes, in the specific period, a period during which the voltage difference between two of U-phase, V-phase, and W-phase voltages is equal to or smaller than a predetermined threshold value.

Specifically, for example, the inverter is provided with a pair of two switching elements, one pair for each of three phases, the pair of two switching elements being connected in series. The inverter drives the motor by performing switching control of each switching element based on the specified voltage value outputted from the specified voltage value producing portion or the specified voltage value held by the specified voltage value holding portion. Let the current flowing between the inverter and the direct-current power supply be called a current to be measured, the motor current detecting portion detects the current to be measured by converting an analog signal commensurate with the current to be measured into a digital signal, and detects the motor current based on the current to be measured, and the threshold value is previously set according to the attenuation time required for oscillation of the current to be measured to be attenuated, the oscillation occurring at the time of switching of each switching element.

Specifically, for example, let the current flowing between the inverter and the direct-current power supply be called a current to be measured, the motor current detecting portion detects the current to be measured by converting an analog signal commensurate with the current to be measured into a digital signal, and detects the motor current based on the current to be measured, and the threshold value is previously set according to the time required for the analog signal to be converted into the digital signal.

Specifically, for example, the inverter is provided with a pair of two switching elements, one pair for each of three phases, the pair of two switching elements being connected in series. The inverter drives the motor by performing switching control of each switching element based on the specified voltage value outputted from the specified voltage value producing portion or the specified voltage value held by the specified voltage value holding portion. The threshold value is previously set according to the switching delay time of each switching element.

Specifically, for example, the specified voltage value holding portion holds the specified voltage value outputted from the specified voltage value producing portion before the specific period.

Specifically, for example, the specified voltage value comprises specified voltage values of two phases in rotating coordinates that rotate as a rotor of the motor rotates.

For example, the motor control device changes the U-phase, V-phase, and W-phase voltages in the specific period according to a position of a rotor of the motor.

Specifically, for example, the motor control device is further provided with: an estimating portion for estimating a position of the rotor of the motor; and a coordinate converting portion for converting the specified voltage values of two phases outputted from the specified voltage value producing portion or the specified voltage values of two phases held by the specified voltage value holding portion into specified three-phase voltage values based on the estimated position of the rotor. The motor control device controls the motor according to the specified three-phase voltage values. Outside the specific period, the estimating portion estimates the position of the rotor based on the motor current. Within the specific period, the estimating portion stops estimating the position of the rotor based on the motor current, and estimates, based on the position of the rotor estimated before the specific period, the position of the rotor in the specific period in accordance with changes in the position of the rotor observed before the specific period or in accordance with rotation speed information of the motor obtained before the specific period.

For example, the motor control device may be provided with: a position detecting portion for detecting a position of the rotor of the motor by using a position sensor; and a coordinate converting portion for converting the specified voltage values of two phases outputted from the specified voltage value producing portion or the specified voltage values of two phases held by the specified voltage value holding portion into specified three-phase voltage values based on the detected position of the rotor, and control the motor according to the specified three-phase voltage values.

According to another aspect of the present invention, a motor drive system is provided with: a three-phase motor; an inverter that drives the motor; and the aforementioned motor control device controlling the motor by controlling the inverter.

The significance and effect of the present invention will become more apparent from the following detailed description of preferred embodiments thereof. It is to be understood that the significance of the present invention and the significance of terms describing the component elements thereof are not limited in any way by those specifically described in the embodiments below, because those embodiments are merely examples of how the invention can be implemented.

BRIEF DESCRIPTION OF THE DRAWINGS

FIG. 6 is a table showing combinations (modes) of the phase voltages in the motor shown in FIG. 1, the combinations depending on which of the three voltages is at the highest, intermediate, and lowest level, and the phase of current detected in each combination.

DETAILED DESCRIPTION OF PREFERRED EMBODIMENTS

Hereinafter, the present invention will be described by way of specific embodiments with reference to the accompanying drawings. Among these drawings, such parts that appear more than once are identified with common reference designations, and in principle the description of any part, once given, will not be repeated. First, matters common to Examples 1 to 4, which will be described later, or matters to which reference is made in these Examples will be described.

Overall Configuration and Single Shunt Current Detection Technique

Figure 1:
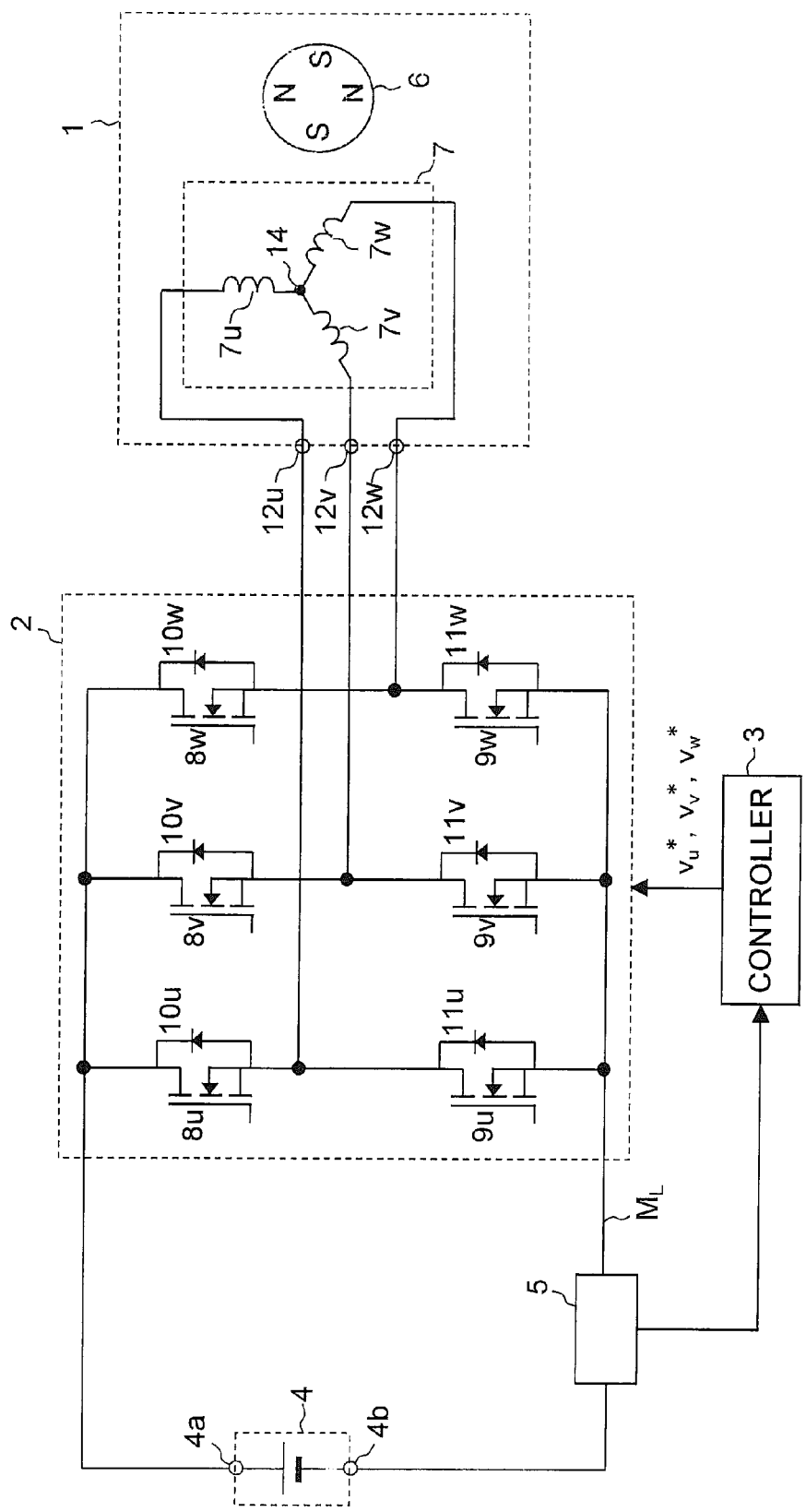
FIG. 1 is a diagram showing an outline of the overall configuration of a motor drive system according to an embodiment of the invention.

First, the overall configuration of a motor drive system according to an embodiment of the invention and a single shunt current detection technique employed in this motor drive system will be described. FIG. 1 is a diagram showing an outline of the overall configuration of the motor drive system.

The motor drive system shown in FIG. 1 includes a three-phase permanent-magnet synchronous motor 1 (hereinafter referred to simply as a "motor 1"), a PWM (pulse width modulation) inverter 2 (hereinafter referred to simply as an "inverter 2"), a controller 3 functioning as a motor control device, a direct-current power supply 4, and a current sensor 5. The direct-current power supply 4 delivers a direct-current voltage between a positive output terminal 4a and a negative output terminal 4b, with the negative output terminal 4b serving as a lower voltage side.

The motor 1 includes a rotor 6 on which a permanent magnet is provided, and a stator 7 on which U-phase, V-phase, and W-phase armature windings (stator windings) 7u, 7v, and 7w are provided. The armature windings 7u, 7v, and 7w are each connected to a neutral point 14 so as to form a Y-connection. The armature windings 7u, 7v, and 7w are connected, at their non-connection nodes facing away from the neutral point 14, to terminals 12u, 12v, and 12w, respectively.

The inverter 2 includes a half-bridge circuit for the U-phase, a half-bridge circuit for the V-phase, and a half-bridge circuit for the W-phase. These three half-bridge circuits form a switching circuit for driving the motor 1. Each half-bridge circuit has a pair of switching elements connected in series. In each half-bridge circuit, the pair of switching elements is connected in series between the positive output terminal 4a and the negative output terminal 4b of the direct-current power supply 4. As a result, the direct-current voltage from the direct-current power supply 4 is applied to each half-bridge circuit.

The half-bridge circuit for the U-phase is composed of a switching element 8u (hereinafter also referred to as an "upper arm 8u") on a higher voltage side and a switching element 9u (hereinafter also referred to as a "lower arm 9u") on a lower voltage side. The half-bridge circuit for the V-phase is composed of a switching element 8v (hereinafter also referred to as an "upper arm 8v") on a higher voltage side and a switching element 9v (hereinafter also referred to as a "lower arm 9v") on a lower voltage side. The half-bridge circuit for the W-phase is composed of a switching element 8w (hereinafter also referred to as an "upper arm 8w") on a higher voltage side and a switching element 9w (hereinafter also referred to as a "lower arm 9w") on a lower voltage side. To the switching elements 8u, 8v, 8w, 9u, 9v, and 9w, diodes 10u, 10v, 10w, 11u, 11v, and 11w are respectively connected in parallel in such a way that the forward directions thereof point in the direction from the lower voltage side of the direct-current power supply 4 to the higher voltage side thereof. The diodes each function as a free-wheel diode.

A node at which the upper arm 8u and the lower arm 9u are connected in series, a node at which the upper arm 8v and the lower arm 9v are connected in series, and a node at which the upper arm 8w and the lower arm 9w are connected in series are connected to the terminals 12u, 12v, and 12w, respectively. In FIG. 1, a field-effect transistor is shown as an example of the switching element; however, it is also possible to use an IGBT (insulated-gate bipolar transistor) or the like as a substitute for the field-effect transistor.

The inverter 2 produces PWM signals (pulse width modulation signals) for different phases based on specified three-phase voltage values fed from the controller 3, and feeds the PWM signals thus produced to the control terminals (base or gate) of switching elements provided in the inverter 2, so as to make the switching elements perform switching operation. The specified three-phase voltage values fed to the inverter 2 from the controller 3 include a specified U-phase voltage value $v_u^*$, a specified V-phase voltage value $v_v^*$, and a specified W-phase voltage value $v_w^*$ representing the voltage levels (voltage values) of a U-phase voltage $v_u$, a V-phase voltage $v_v$, and a W-phase voltage $v_w$, respectively. Based on $v_u^*$, $v_v^*$, and $v_w^*$, the inverter 2 controls on/off of each switching element (brings it into/out of conduction).

Let the dead time that is inserted for preventing the upper arm and the lower arm of the same phase from being simultaneously turned on be ignored. Then, in each half-bridge circuit, when the upper arm is on, the lower arm is off; when the upper arm is off, the lower arm is on. Hereinafter, unless otherwise specified, it is assumed that the dead time is ignored.

The direct-current voltage applied to the inverter 2 by the direct-current power supply 4 is modulated by using PWM (pulse width modulation), for example, by the switching operation of the switching elements provided in the inverter 2, and is converted into a three-phase alternating-current voltage. When the three-phase alternating-current voltage thus obtained is applied to the motor 1, currents commensurate with the three-phase alternating-current voltage flow through the armature windings (7u, 7v, and 7w), whereby the motor 1 is driven.

The current sensor 5 detects a current (hereinafter referred to as a "bus current") flowing through the bus $M_L$ of the inverter 2. Since the bus current has a direct-current component, it can be considered as an equivalent of a direct current. In the inverter 2, the lower arms 9u, 9v, and 9w are connected together at the lower voltage sides thereof, and are connected to the negative output terminal 4b of the direct-current power supply 4. A conductor to which the lower arms 9u, 9v, and 9w are connected together at the lower voltage sides thereof is the bus $M_L$, and the current sensor 5 is connected in series to the bus $M_L$. The current sensor 5 transmits, to the controller 3, a signal indicating a current value of the detected bus current (detected current). The controller 3 produces the specified three-phase voltage values by referring to the output signal, for example, of the current sensor 5, and outputs the specified three-phase voltage values thus produced. Incidentally, the current sensor 5 is, for example, a shunt resistor or a current transformer. The current sensor 5 may be connected to a conductor via which the upper arms 8u, 8v, and 8w are connected at the higher voltage sides thereof to the positive output terminal 4a, instead of connecting to the conductor (bus $M_L$) via which the lower arms 9u, 9v, and 9w are connected at the lower voltage sides thereof to the negative output terminal 4b.

Here, with reference to FIGS. 2, 3, 4, 5A to 5D, and 6, a description will be given of, for example, a relationship between bus current and phase current flowing through an armature winding of each phase. The currents flowing through the armature windings 7u, 7v, and 7w shown in FIG. 1 are referred to as a U-phase current, a V-phase current, and a W-phase current, respectively, which are individually (or collectively) referred to as a phase current. The following description assumes that the polarity of a phase current flowing into the neutral point 14 from the terminals 12u, 12v, or 12w is positive, and the polarity of a phase current flowing from the neutral point 14 is negative.

Figures 2, 3:
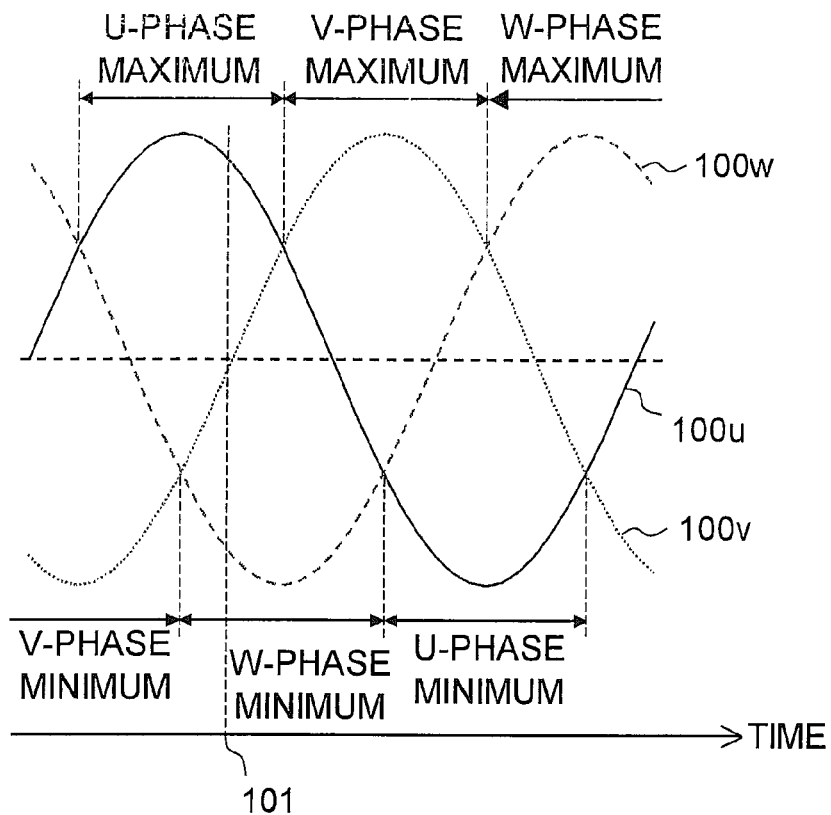
FIG. 2 is a diagram showing a typical example of the three-phase alternating-current voltage applied to the motor shown in FIG. 1.
FIG. 3 is a table showing different patterns of energizing the motor shown in FIG. 1, and a relationship between energizing pattern and bus current.

FIG. 2 is a diagram showing a typical example of the three-phase alternating-current voltage applied to the motor 1. In FIG. 2, reference characters 100u, 100v, and 100w represent the waveforms of the U-phase voltage, the V-phase voltage, and W-phase voltage, respectively, to be applied to the motor 1. The U-phase voltage, the V-phase voltage, and the W-phase voltage are individually (or collectively) referred to as a phase voltage. If a sinusoidal current is passed through the motor 1, the inverter 2 outputs a voltage having a sinusoidal waveform.

As shown in FIG. 2, which of the U-phase voltage, the V-phase voltage, and the W-phase voltage is at the highest, intermediate, and lowest level varies with time. Which of the three voltages is at the highest, intermediate, and lowest level depends on the specified three-phase voltage values, and the inverter 2 determines an energizing pattern of different phases according to the specified three-phase voltage values. This energizing pattern is shown in FIG. 3 as a table. FIG. 3 shows, from the left, different energizing patterns in the first to third columns; the fourth column will be described later.

The energizing patterns are an energizing pattern "LLL" in which all the lower arms of the U-, V-, and W-phases are on;

an energizing pattern "LLH" in which the upper arm of the W-phase is on, and the lower arms of the U- and V-phases are on;

an energizing pattern "LHL" in which the upper arm of the V-phase is on, and the lower arms of the U- and W-phases are on;

an energizing pattern "LHH" in which the upper arms of the V- and W-phases are on, and the lower arm of the U-phase is on;

an energizing pattern "HLL" in which the upper arm of the U-phase is on, and the lower arms of the V- and W-phases are on;

an energizing pattern "HLH" in which the upper arms of the U- and W-phases are on, and the lower arm of the V-phase is on;

an energizing pattern "HHL" in which the upper arms of the U- and V-phases are on, and the lower arm of the W-phase is on; and an energizing pattern "HHH" in which all the upper arms of the U-, V, and W-phases are on (in the description above, reference characters (e.g., 8u) of the upper and lower arms are omitted).

Figure 4:
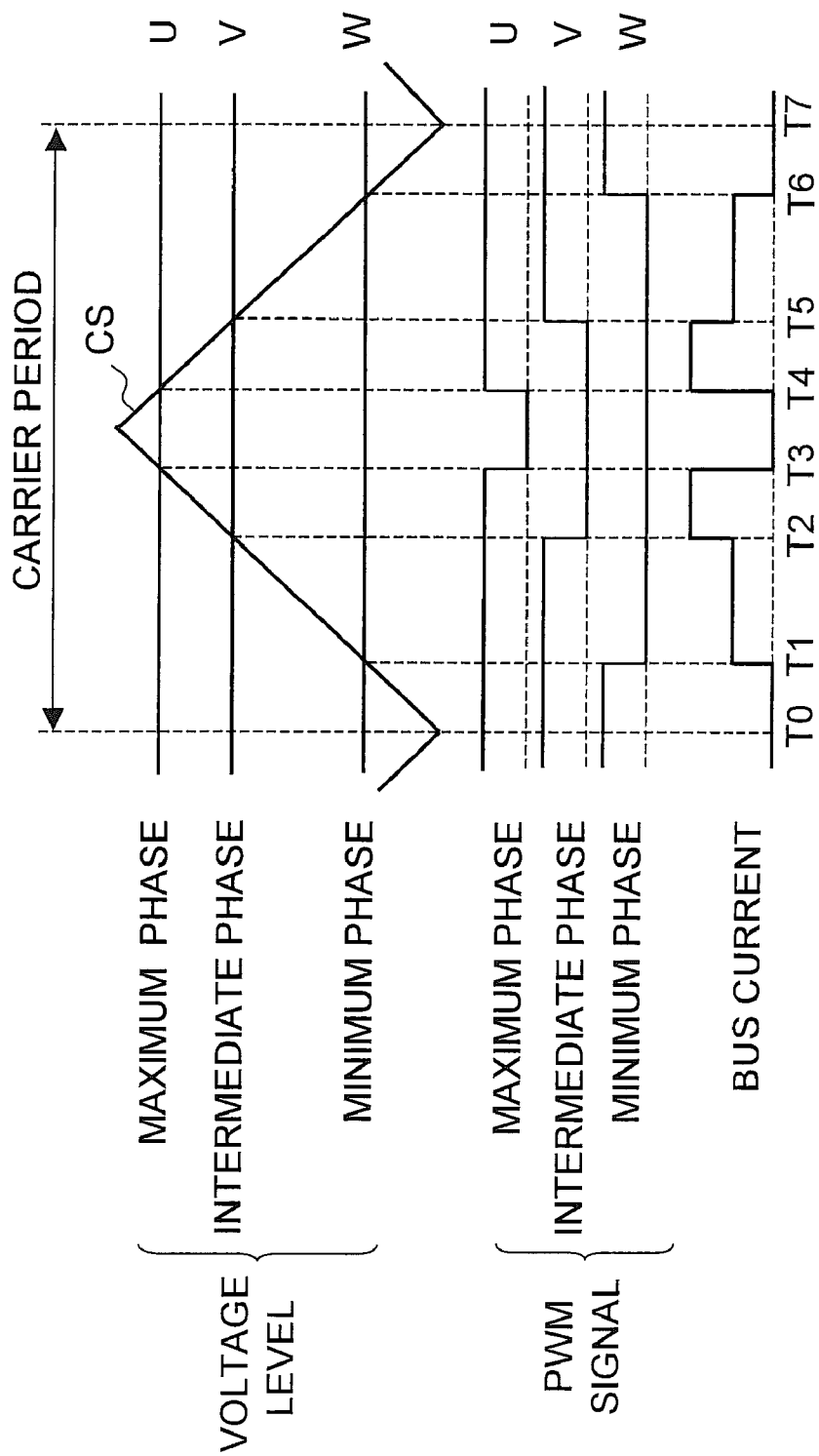
FIG. 4 is a diagram showing a relationship between voltage levels of different phase voltages and carrier signal in the motor shown in FIG. 1, and the corresponding waveforms of the PWM signals and the bus current.

FIG. 4 shows a relationship between voltage levels of different phase voltages and carrier signal in a case where three-phase modulation is performed, and the corresponding waveforms of the PWM signals and the bus current. Since which of the phase voltages is at the highest, intermediate, and lowest level varies, FIG. 4 deals with a time point 101 shown in FIG. 2 for the sake of concreteness. That is, FIG. 4 shows a state in which the U-phase voltage is at the highest level, and the W-phase voltage is at the lowest level. Hereinafter, a phase whose voltage level is the highest is referred to as a "maximum phase", a phase whose voltage level is the lowest is referred to as a "minimum phase", and a phase whose voltage level is neither the highest nor the lowest is referred to as an "intermediate phase". In the state shown in FIG. 4, the maximum phase, the intermediate phase, and the minimum phase are the U-phase, the V-phase, and the W-phase, respectively. In FIG. 4, reference character CS represents a carrier signal to be compared with the voltage level of each phase voltage. The carrier signal is a periodic triangular wave signal, and the period of this signal is called a carrier period. It is to be noted that, since the carrier period is much shorter than the period of the three-phase alternating-current voltage shown in FIG. 2, if a triangular wave of the carrier signal shown in FIG. 4 is shown in FIG. 2, the triangular wave appears as a single line.

Referring to FIGS. 5A to 5D in addition to the aforementioned drawings, a relationship between phase current and bus current will be described. FIGS. 5A to 5D are each an equivalent circuit diagram of a part around the armature winding, each showing a state in a given period of time shown in FIG. 4.

Figure 5A:
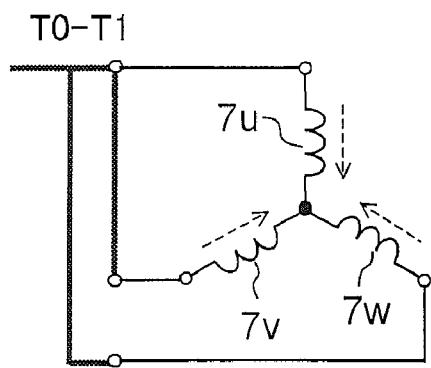
FIGS. 5A to 5D are each an equivalent circuit diagram of a part of FIG. 1 around the armature winding, each showing a state in a given period of time shown in FIG. 4.

A time point at which a carrier period starts, that is, a time point at which the carrier signal is at the lowest level, is referred to as T0. At time point T0, the upper arms (8u, 8v, and 8w) of all the phases are turned on. In this case, since no current flows through the direct-current power supply 4 due to formation of a short circuit, as shown in FIG. 5A, the bus current is zero.

Figure 5B:
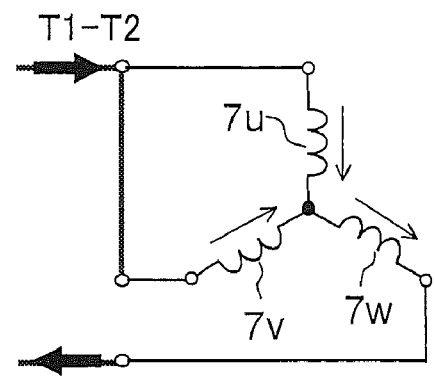

The inverter 2 compares the voltage level of each phase voltage with the carrier signal by referring to $v_u^*$, $v_v^*$, and $v_w^*$. The level (voltage level) of the carrier signal starts to increase, and, when the voltage level of the minimum phase crosses the carrier signal at time point T1, the lower arm of the minimum phase is turned on. As a result, as shown in FIG. 5B, the current of the minimum phase flows as the bus current. In the example shown in FIG. 4, from time point T1 to time point T2, which will be described later, since the lower arm 9w of the W-phase is on, the W-phase current (with negative polarity) flows as the bus current.

Figure 5C:
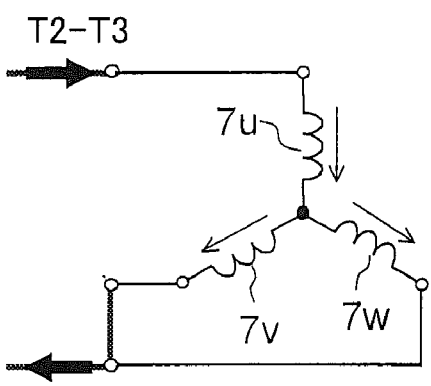

Then, the level of the carrier signal further increases, and, when the voltage level of the intermediate phase crosses the carrier signal at time point T2, the upper arm of the maximum phase is turned on, and the lower arms of the intermediate phase and the minimum phase are turned on. As a result, as shown in FIG. 5C, the current of the maximum phase flows as the bus current. In the example shown in FIG. 4, from time point T2 to time point T3, which will be described later, since the upper arm 8u of the U-phase and the lower arms 9v and 9w of the V- and W-phases are on, the U-phase current (with positive polarity) flows as the bus current.

Figure 5D:
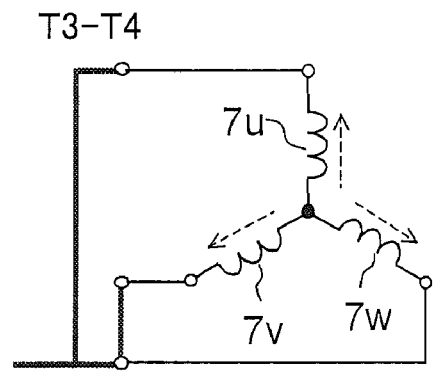

Then, the level of the carrier signal further increases, and, when the voltage level of the maximum phase crosses the carrier signal at time point T3, the lower arms of all the phases are turned on. In this case, since no current flows through the direct-current power supply 4 due to formation of a short circuit, as shown in FIG. 5D, the bus current is zero.

After the carrier signal reaches its highest level at a time point between time point T3 and time point T4, which will be described later, the level of the carrier signal starts to decrease. As the level of the carrier signal decreases, the states shown in FIGS. 5D, 5C, 5B, and 5A appear in this order. That is, when the level of the carrier signal decreases, let time point at which the voltage level of the maximum phase crosses the carrier signal, time point at which the voltage level of the intermediate phase crosses the carrier signal, time point at which the voltage level of the minimum phase crosses the carrier signal, and time point at which the next carrier period starts be referred to as T4, T5, T6, and T7. Then, the energizing patterns between time points T4 and T5, between time points T5 and T6, and between time points T6 and T7 are the same as those between time points T2 and T3, between time points T1 and T2, and between time points T0 and T1, respectively.

Therefore, for example, by detecting the bus current between time points T1 and T2 or between time points T5 and T6, it is possible to detect the current of the minimum phase based on the bus current thus detected; by detecting the bus current between time points T2 and T3 or between time points T4 and T5, it is possible to detect the current of the maximum phase based on the bus current thus detected. For the current of the intermediate phase, it can be obtained by calculation by exploiting the fact that the total sum of the three-phase currents becomes zero. In the fourth column of the table of FIG. 3, the phase of a current flowing as the bus current in each energizing pattern is shown with the polarity of the current. For example, in the energizing pattern "HHL" given in the eighth row of the table of FIG. 3, the W-phase current (with negative polarity) flows as the bus current.

It is to be noted that, in the carrier period, a time period other than a time period between time points T1 and T6 represents the pulse width of the PWM signal for the minimum phase, a time period other than a time period between time points T2 and T5 represents the pulse width of the PWM signal for the intermediate phase, and a time period other than a time period between time points T3 and T4 represents the pulse width of the PWM signal for the maximum phase.

It is to be understood that the description heretofore assumes, as an example, a case in which the U-phase is the maximum phase and the W-phase is the minimum phase. However, six different combinations of the maximum phase, the intermediate phase, and the minimum phase are possible. These combinations are presented in a table of FIG. 6. Let the U-phase voltage, the V-phase voltage, and the W-phase voltage be represented by $v_u$, $v_v$, and $v_w$, respectively. Then, a state in which $v_u > v_v > v_w$ holds is referred to as a first mode;

a state in which $v_v > v_u > v_w$ holds is referred to as a second mode;

a state in which $v_v > v_w > v_u$ holds is referred to as a third mode;

a state in which $v_w > v_v > v_u$ holds is referred to as a fourth mode;

a state in which $v_w > v_u > v_v$ holds is referred to as a fifth mode; and a state in which $v_u > v_w > v_v$ holds is referred to as a sixth mode.

The example shown in FIGS. 4 and 5A to 5D corresponds to the first mode. FIG. 6 also shows the phase of a current detected in each mode.

Specifically, the U-phase specified voltage value $v_u^*$, the V-phase specified voltage value $v_v^*$, and the W-phase specified voltage value $v_w^*$ are expressed as counter set values CntU, CntV, and CntW, respectively. The higher the phase voltage, the greater the set value assigned thereto. For example, in the first mode, CntU>CntV>CntW holds.

A counter (unillustrated) provided in the controller 3 counts up, starting from 0, from time point T0 every carrier period. When the count reaches CntW, switching is performed from a state in which the upper arm 8w of the W-phase is on to a state in which the lower arm 9w thereof is on. When the count reaches CntV, switching is performed from a state in which the upper arm 8v of the V-phase is on to a state in which the lower arm 9v thereof is on. When the count reaches CntU, switching is performed from a state in which the upper arm 8u of the U-phase is on to a state in which the lower arm 9u thereof is on. After the carrier signal reaches its maximum level, the count is counted down, and switching operation is performed the other way around.

Therefore, in the first mode, a time point at which the count reaches CntW corresponds to time point T1; a time point at which the count reaches CntV corresponds to time point T2; and a time point at which the count reaches CntU corresponds to time point T3. Thus, in the first mode, while the count is being counted up, by sampling the output signal of the current sensor 5 at a time point at which the count is greater than CntW and smaller than CntV, it is possible to detect the W-phase current (with negative polarity) flowing as the bus current; by sampling the output signal of the current sensor 5 at a time point at which the count is greater than CntV and smaller than CntU, it is possible to detect the U-phase current (with positive polarity) flowing as the bus current.

Similarly, as shown in FIG. 6, in the second mode, a time point at which the count reaches CntW corresponds to time point T1; a time point at which the count reaches CntU corresponds to time point T2; and a time point at which the count reaches CntV corresponds to time point T3. Therefore, in the second mode, while the count is being counted up, it is possible to detect the W-phase current (with negative polarity) as the bus current flowing at a time point at which the count is greater than CntW and smaller than CntU, and it is possible to detect the V-phase current (with positive polarity) as the bus current flowing at a time point at which the count is greater than CntU and smaller than CntV. The same holds true for the third to sixth modes.

In addition, a time point (sampling time point; for example, a time point midway between time points T1 and T2) at which sampling is performed for detecting the phase current of the minimum phase between time points T1 and T2 is represented by reference character ST1, and a time point (sampling time point; for example, a time point midway between time points T2 and T3) at which sampling is performed for detecting the phase current of the maximum phase between time points T2 and T3 is represented by reference character ST2.

Incidentally, the pulse width (and duty ratio) of the PWM signal for each phase is determined based on the counter set values CntU, CnuV, and CntW given as the specified three-phase voltage values ($v_u^*$, $v_v^*$, and $v_w^*$).

Figure 7:
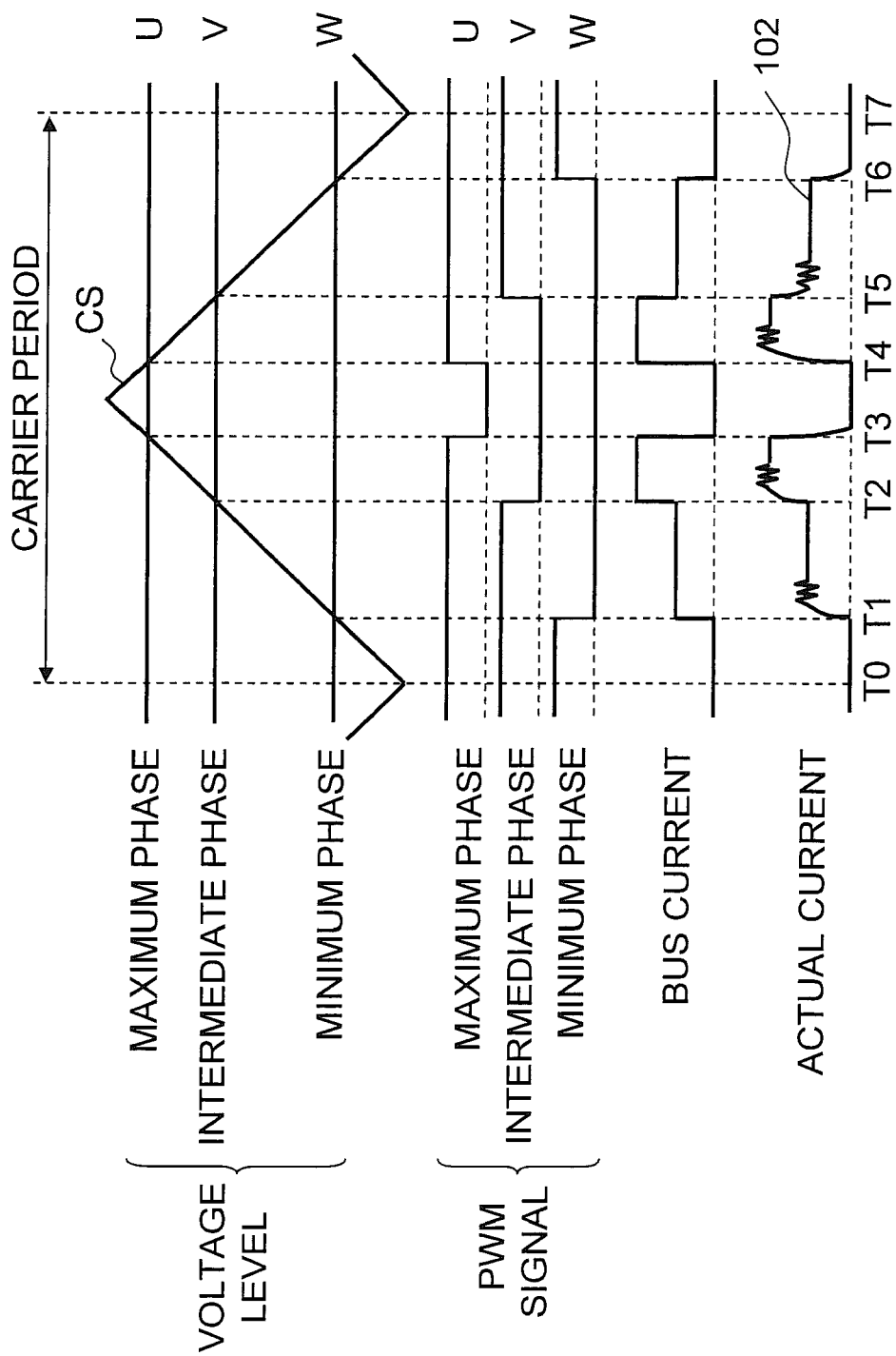
FIG. 7 is a diagram obtained by adding, to the diagram shown in FIG. 4, the waveform of an actually observed bus current.

These are the principles by which different phase currents can be detected based on the bus current. It is to be understood, however, that the current waveform of an actual bus current represented by reference character 102 shown in FIG. 7 includes ringing. In addition, there is, for example, a sampling time delay associated with A/D conversion performed on the analog output signal of the current sensor 5. With consideration given to these factors, if a voltage difference between any two of the three phase voltages is equal to or smaller than a predetermined lower limit threshold value $V_{LIM}$, the actual measurement of two phase currents is impossible.

Hereinafter, a voltage difference between any two of the three phase voltages is referred to as a "voltage difference between two phases", and a time period during which the actual measurement of two phase currents is impossible is referred to as an "unmeasurable time period". In the following description, the "voltage difference between two phases" denotes the smallest voltage difference of three voltage differences: a voltage difference between the U-phase voltage and the V-phase voltage, a voltage difference between the V-phase voltage and the W-phase voltage, and a voltage difference between the W-phase voltage and the U-phase voltage.

Specifically, if half the difference between the pulse widths of any two of three phase voltages is equal to or shorter than time $T_{min}$ given by formula (A) below, the voltage difference between two phases is equal to or smaller than the lower limit threshold value $V_{LIM}$, making the actual measurement of two phase currents impossible. In an example shown in FIG. 4 (or FIG. 7), if the time between time periods T1 and T2 or the time between time periods T2 and T3 is equal to or shorter than the time $T_{min}$, the voltage difference between two phases is equal to or smaller than the lower limit threshold value $V_{LIM}$. Since the pulse width of the PWM signal is determined based on the specified three-phase voltage values ($v_u^*$, $v_v^*$, and $v_w^*$), it is possible to determine whether the present time is within an unmeasurable time period based on the specified three-phase voltage values.

$$T_{min} = T_d + T_{rig} + T_{smpl} + (T_{power\_on} - T_{power\_off}) \quad (A)$$

Here, $T_d$ represents the previously set dead time, $T_{rig}$ represents the time that elapsed before the disappearance of ringing in the bus current, $T_{smpl}$ represents a sampling time delay associated with A/D conversion performed on the analog output signal of the current sensor 5, $T_{power\_off}$ represents the turn-off delay time of the upper or lower arm, and $T_{power\_on}$ represents the turn-on delay time of the upper or lower arm. The time $T_{min}$ is previously set at the design stage of the motor drive system.

A further description is given of $T_{rig}$ and the like. The inverter 2 performs switching on/off of the upper and lower arms of three phases, and thereby supplies a motor current to the motor 1 to drive it. At the time of this switching, a high-frequency oscillation appears in the current waveform of the bus current. This oscillation is generally called ringing. This oscillation in the current waveform is attenuated over time, and the time (attenuation time) required for sufficient attenuation of oscillation to achieve a stabilized current waveform of the bus current corresponds to the time $T_{rig}$. The time $T_{rig}$ is previously set at the design stage of the motor drive system by the actual measurement of the current waveform, for example.

Furthermore, the controller 3 includes an A/D converter (unillustrated) that converts the analog output signal of the current sensor 5 into a digital signal, and detects the current value of the bus current based on the digital signal. This A/D converter is provided, for example, in a motor current reconstructing portion 21 (see FIG. 9), which will be described later. In order to make the A/D converter sample an analog signal having a given voltage value and output a digital signal that precisely indicates that given voltage value, it is necessary to maintain the analog signal to be fed to the A/D converter at that given voltage value for a certain prescribed period. The length of this certain prescribed period corresponds to $T_{smpl}$. The length of this certain prescribed period (that is, time $T_{smpl}$) is a unique time length determined by electrical characteristics of the A/D converter, and is previously set at the design stage of the motor drive system.

In the following description, the turn-off delay time and the turn-on delay time will be explained. For the sake of concreteness, the following description assumes that the switching elements (8u, 8v, 8w, 9u, 9v, and 9w) are each a field-effect transistor (FET). While an FET is in an on state, suppose that an OFF signal for turning off the FET is fed to the gate of the FET. Then, the FET is completely off when the turn-off delay time has elapsed after the OFF signal was fed to the gate; the FET is in an on state or in the transition state from an on state to an off state until the turn-off delay time has elapsed. Likewise, while an FET is in an off state, suppose that an ON signal for turning on the FET is fed to the gate of the FET. Then, the FET is completely on when the turn-on delay time has elapsed after the ON signal was fed to the gate; the FET is in an off state or in the transition state from an off state to an on state until the turn-on delay time has elapsed. The turn-off delay time $T_{power\_off}$ and the turn-on delay time $T_{power\_on}$ are determined by electrical characteristics of each switching element (such as 8u), and are taken into consideration in setting the time $T_{min}$. The turn-off delay time and the turn-on delay time can be collectively called a switching delay time.

The time $T_{min}$ is uniquely determined by determining $T_d$, $T_{rig}$, $T_{smpl}$, $T_{power\_off}$, and $T_{power\_on}$ at the design stage of the motor drive system. Based on the time $T_{min}$ and the carrier frequency (the frequency of the carrier signal) adopted by the inverter 2, the smallest voltage difference between two phases, which is necessary for the actual measurement of two phase currents, is uniquely determined. The smallest voltage difference thus determined is equal to the lower limit threshold value $V_{LIM}$. The lower limit threshold value $V_{LIM}$ too is previously determined at the design stage of the motor drive system (controller 3), and is used for determining whether or not the present time is within the unmeasurable time period (or a holding period, which will be described later).

The motor drive system according to this embodiment has the function of maintaining, in the unmeasurable time period, a specified voltage value in rotating coordinates at a specified voltage value obtained before the unmeasurable time period.

Definition of State Quantities and Others

Figure 8:
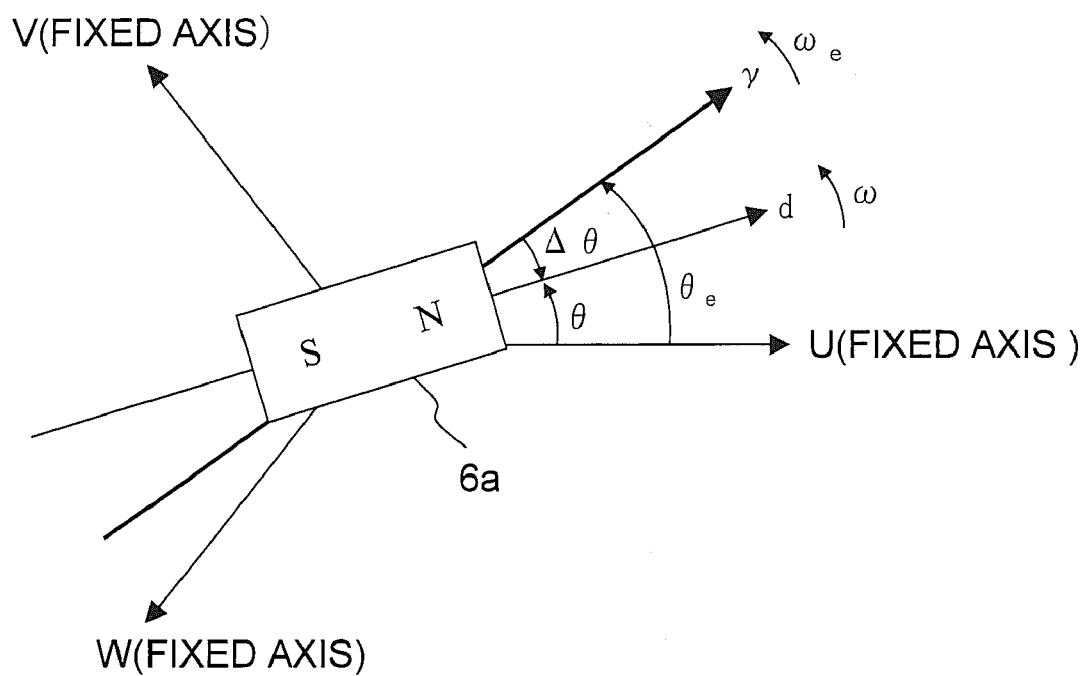
FIG. 8 is an analysis model diagram of the motor shown in FIG. 1.

Before presenting a detailed description of the aforementioned function, different state quantities (state parameters) will be described and defined. FIG. 8 is an analysis model diagram of the motor 1. FIG. 8 shows the U-phase, V-phase, and W-phase armature winding fixed axes (hereinafter also referred to simply as the "U-phase axis", the "V-phase axis", and the "W-phase axis"). Reference character 6a represents the permanent magnet provided on the rotor 6 of the motor 1. In a rotating coordinate system that rotates at the same speed as the magnetic flux produced by the permanent magnet 6a, the direction of the magnetic flux produced by the permanent magnet 6a is referred to as the d-axis, and the rotation axis for control purposes, the rotation axis corresponding to the d-axis, is referred to as the γ-axis. Though not illustrated, the axis having a phase leading the d-axis by an electrical angle of 90 degrees is referred to as the q-axis, and the axis having a phase leading the γ-axis by an electrical angle of 90 degrees is referred to as the δ-axis. The d-axis and the q-axis are collectively referred to as the d-q axes, and the coordinates having the d-q axes as their coordinate axes are referred to as the d-q coordinates. The γ-axis and the δ-axis are collectively referred to as the γ-δ axes, and the coordinates having the γ-δ axes as their coordinate axes are referred to as the γ-δ coordinates.

The d-q axes rotates, and its rotation speed is represented by ω. The γ-δ axes also rotates, and its rotation speed is represented by $\omega_e$. With respect to the d-q axes in rotation, the phase (angle) of the d-axis at a given moment is represented, relative to the U-phase armature winding fixed axis, by θ. Likewise, with respect to the γ-δ axes in rotation, the phase (angle) of the γ-axis at that given moment is represented, relative to the U-phase armature winding fixed axis, by $\theta_e$. Then, the axis error Δθ between the d- and γ-axes is given by $\Delta\theta = \theta - \theta_e$. The phase (angle) represented by θ or $\theta_e$ is the phase (angle) in electrical angle, and is referred to as a rotor position, as commonly called. The rotation speed represented by ω or $\omega_e$ is the angular velocity at electrical angle.

The whole of the motor voltage applied to the motor 1 from the inverter 2 is referred to as the motor voltage $V_a$, and the whole of the motor current supplied to the motor 1 from the inverter 2 is referred to as the motor current $I_a$. The γ-axis component, the δ-axis component, the d-axis component, and the q-axis component of the motor voltage $V_a$ are referred to as the δ-axis voltage $v_\gamma$, the δ-axis voltage $v_\delta$, the d-axis voltage $v_d$, and the q-axis voltage $v_q$, respectively. The δ-axis component and the δ-axis component of the motor current $I_a$ are referred to as the γ-axis current $i_\gamma$ and the δ-axis current $i_\delta$, respectively.

The value specifying the δ-axis voltage $v_\gamma$ and the value specifying the δ-axis voltage $v_\delta$ are referred to as the specified δ-axis voltage value $v_\gamma^*$ and the specified δ-axis voltage value $v_\delta^*$, respectively. The specified δ-axis voltage value $v_\gamma^*$ represents the voltage (voltage value) to be followed by $v_\gamma$, and the specified δ-axis voltage value $v_\delta^*$ represents the voltage (voltage value) to be followed by $v_\delta$. The value specifying the γ-axis current $i_\gamma$ and the value specifying the δ-axis current $i_\delta$ are referred to as the specified γ-axis current value $i_\gamma^*$ and the specified δ-axis current value $i_\delta^*$, respectively. The specified γ-axis current value $i_\gamma^*$ represents the current (current value) to be followed by $i_\gamma$, and the specified δ-axis current value $i_\delta^*$ represents the current (current value) to be followed by $i_\delta$.

EXAMPLE 1

Figure 9:
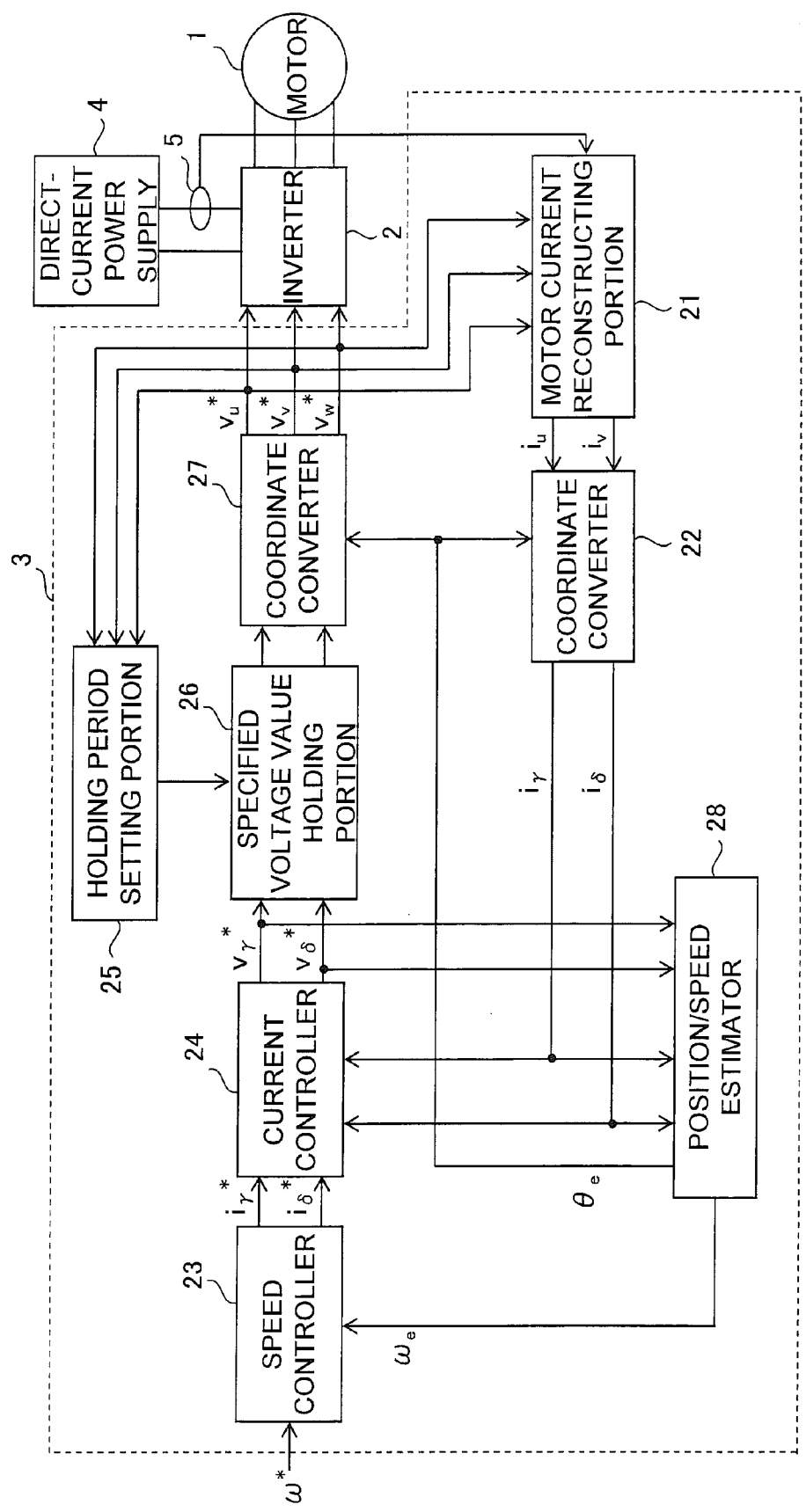
FIG. 9 is a detailed block diagram of a motor drive system according to Example 1 of the invention.

Example 1 of the motor drive system shown in FIG. 1 will be described. FIG. 9 is a detailed block diagram of the motor drive system according to Example 1. As shown in FIG. 9, the controller 3 includes different parts represented by reference numerals 21 to 28. The different parts constituting the motor drive system can freely use all the values produced within the motor drive system as necessary.

The motor current reconstructing portion 21 reconstructs the motor current $I_a$ by specifying, based on the specified three-phase voltage values ($v_u^*$, $v_v^*$, $v_w^*$) outputted from the coordinate converter 27, the sampling time point ST1 at which the phase current of the minimum phase is detected and the sampling time point ST2 at which the phase current of the maximum phase is detected (see FIG. 6), then sampling the analog output signal from the current sensor 5 at the sampling time points ST1 and ST2, and then performing A/D conversion on the sampled analog output signals. Specifically, the motor current reconstructing portion 21 reconstructs the U-phase current $i_u$ and the V-phase current $i_v$, and sends them to the coordinate converter 22. In doing so, the motor current reconstructing portion 21 exploits, if necessary, the fact that the total sum of the U-phase current $i_u$, the V-phase current $i_v$, and the W-phase current $i_w$ is zero. It is to be understood that, as far as the current is concerned, to "reconstruct the current" is synonymous with to "detect the current". Therefore, the motor current reconstructing portion can be also called the motor current detecting portion.

By performing coordinate conversion so that the U-phase current $i_u$ and the V-phase current $i_v$ are converted into those on the γ-δ axes based on the rotor position (estimated rotor position) $\theta_e$ fed from the position/speed estimator 28 (hereinafter referred to simply as the "estimator 28"), the coordinate converter 22 calculates the γ-axis current $i_\gamma$ and the δ-axis current $i_\delta$, and outputs them.

By referring to a specified rotation speed ω* fed from a specified rotation speed producing portion (unillustrated) provided inside or outside the controller 3, and the rotation speed (estimated rotation speed) $\omega_e$ fed from the estimator 28, and by performing, for example, proportional-plus-integral control, the speed controller 23 calculates the specified γ-axis current value $i_\gamma^*$ and the specified δ-axis current value $i_\delta^*$ such that the speed error ($\omega^* - \omega_e$) is made to converge to zero, and outputs them.

By referring to $i_\gamma^*$ and $i_\delta^*$ calculated by the speed controller 23 and $i_\gamma$ and $i_\delta$ outputted from the coordinate converter 22, and by performing, for example, proportional-plus-integral control, the current controller 24 calculates the specified γ-axis voltage value $v_\gamma^*$ and the specified δ-axis voltage value $v_\delta^*$ such that the current errors ($i_\gamma^* - i_\gamma$) and ($i_\delta^* - i_\delta$) are made to converge to zero, and outputs them.

The different parts constituting the controller 3 update, at intervals of a predetermined period, the specified values (including $i_\gamma^*$, $i_\delta^*$, $v_\gamma^*$, $v_\delta^*$, $v_u^*$, $v_v^*$, and $v_w^*$) or the state quantities (including $i_u$, $i_v$, $i_\gamma$, $i_\delta$, $\delta_e$, and $\omega_e$) calculated thereby and outputted therefrom.

The holding period setting portion 25 determines whether or not the voltage difference between two phases is equal to or smaller than the lower limit threshold value $V_{LIM}$ based on the specified three-phase voltage values ($v_u^*$, $v_v^*$, and $v_w^*$) outputted from the coordinate converter 27, and sets a holding period based on the determination results. The holding period setting portion 25 sets the holding period such that it fully covers the period (that is, the unmeasurable time period) during which the voltage difference between two phases is equal to or smaller than the lower limit threshold value $V_{LIM}$. For example, the holding period is so set as to coincide with the period during which the voltage difference between two phases is equal to or smaller than the lower limit threshold value $V_{LIM}$.

The specified voltage value holding portion 26 holds $v_\gamma^*$ and $v_\delta^*$ outputted from the current controller 24 at a particular time point under the control of the holding period setting portion 25. Outside the holding period, the specified voltage value holding portion 26 outputs $v_\gamma^*$ and $v_\delta^*$ the current controller 24 is outputting, as they are, to the coordinate converter 27. Within the holding period, the specified voltage value holding portion 26 outputs $v_\gamma^*$ and $v_\delta^*$ held thereby to the coordinate converter 27. It is to be noted that, even outside the holding period, the specified voltage value holding portion 26 may hold $v_\gamma^*$ and $v_\delta^*$ outputted at a particular time point (these values are not fed to the coordinate converter 27). Therefore, although the holding period is related to a period during which the specified voltage value holding portion 26 holds $v_\gamma^*$ and $v_\delta^*$ outputted at a particular time point, they do not always completely correspond with each other (they, however, sometimes correspond with each other). In order to prevent the "holding period" from being confused with the "period during which the specified voltage value holding portion 26 holds $v_\gamma^*$ and $v_\delta^*$ outputted at a particular time point" altogether, the "holding period" described in this embodiment can be replaced by the "specific period".

The coordinate converter 27 calculates the specified three-phase voltage values ($v_u^*$, $v_v^*$, and $v_w^*$) by performing coordinate conversion, based on the rotor position $\theta_e$ outputted from the estimator 28, so that $v_\gamma^*$ and $v_\delta^*$ fed from the specified voltage value holding portion 26 are converted into those on the three-phase fixed coordinate axes, and outputs them.

The estimator 28 estimates the rotor position $\theta_e$ and the rotation speed $\omega_e$ such that the axis error $\Delta\theta$ (see FIG. 8) between the d- and γ-axes is made to converge to zero by performing, for example, proportional-plus-integral control by using all or part of $i_\gamma$ and $i_\delta$ outputted from the coordinate converter 22 and $v_\gamma^*$ and $v_\delta^*$ outputted from the current controller 24. There have conventionally been proposed various methods for estimating the rotor position $\theta_e$ and the rotation speed $\omega_e$ and any method heretofore known can be adopted in the estimator 28. For example, a method that is disclosed in JP-B-3411878 may be adopted. The rotor position $\theta_e$ estimated by the estimator 28 is outputted to the coordinate converters 22 and 27, and the rotation speed $\omega_e$ estimated by the estimator 28 is outputted to the speed controller 23.

The inverter 2 controls the switching of each arm provided in the inverter 2 in accordance with the specified three-phase voltage values outputted from the coordinate converter 27, and thereby supplies the motor current $I_a$ commensurate with the specified values (such as $i_\gamma^*$ and $i_\delta^*$) produced in the controller 3 to the motor 1 to drive it.

Figure 10:
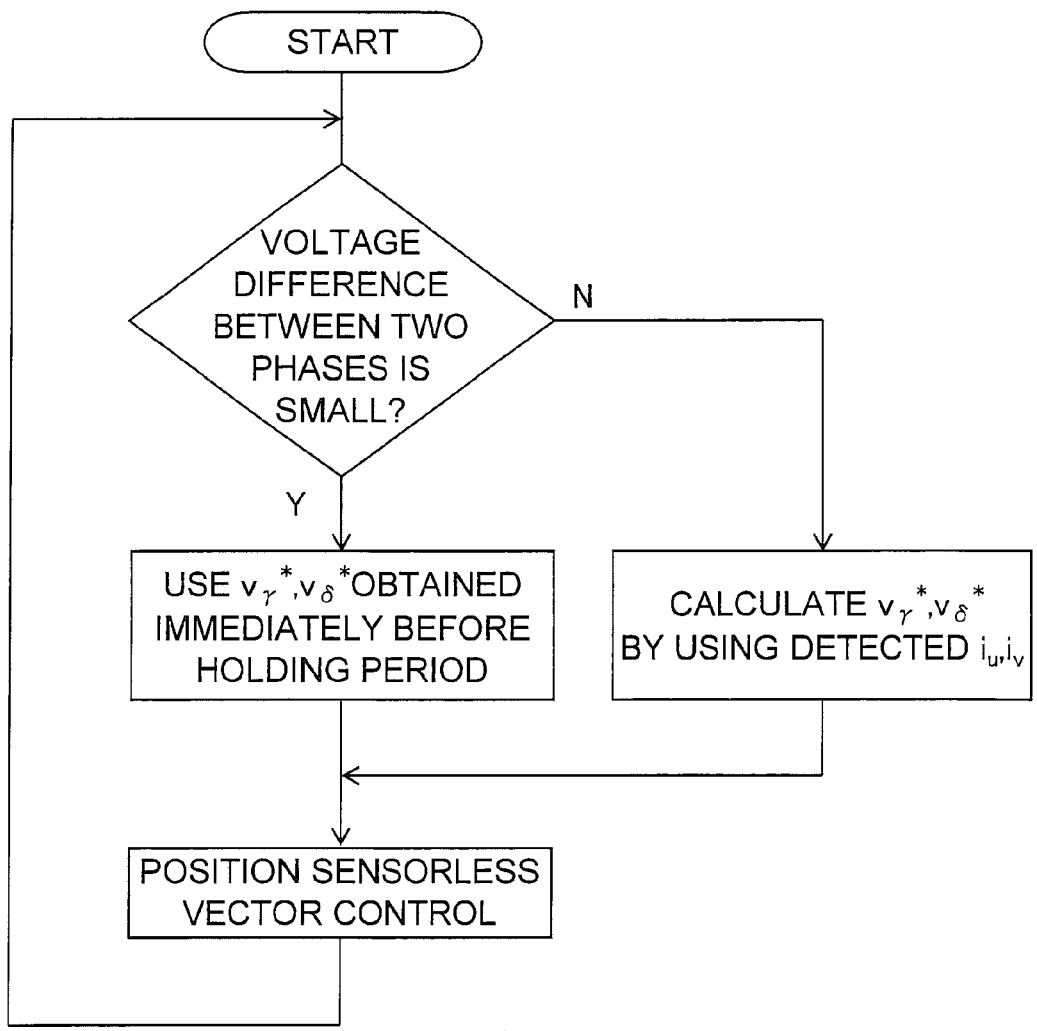
FIG. 10 is a flow chart showing a schematic operation procedure of the controller shown in FIG. 9.

FIG. 10 shows a schematic operating procedure of the controller 3, with attention focused on the voltage difference between two phases. The controller 3 sets a period during which the voltage difference between two phases is relatively small as the holding period, and performs, for example, position sensorless vector control in the holding period by using $v_\gamma^*$ and $v_\delta$ obtained immediately before the holding period. On the other hand, outside the holding period, the controller 3 calculates $v_\gamma^*$ and $v_\delta^*$ based on the detected $i_u$ and $i_v$, and performs position sensorless vector control based on $v_\gamma^*$ and $v_\delta^*$ thus calculated.

Figure 11:
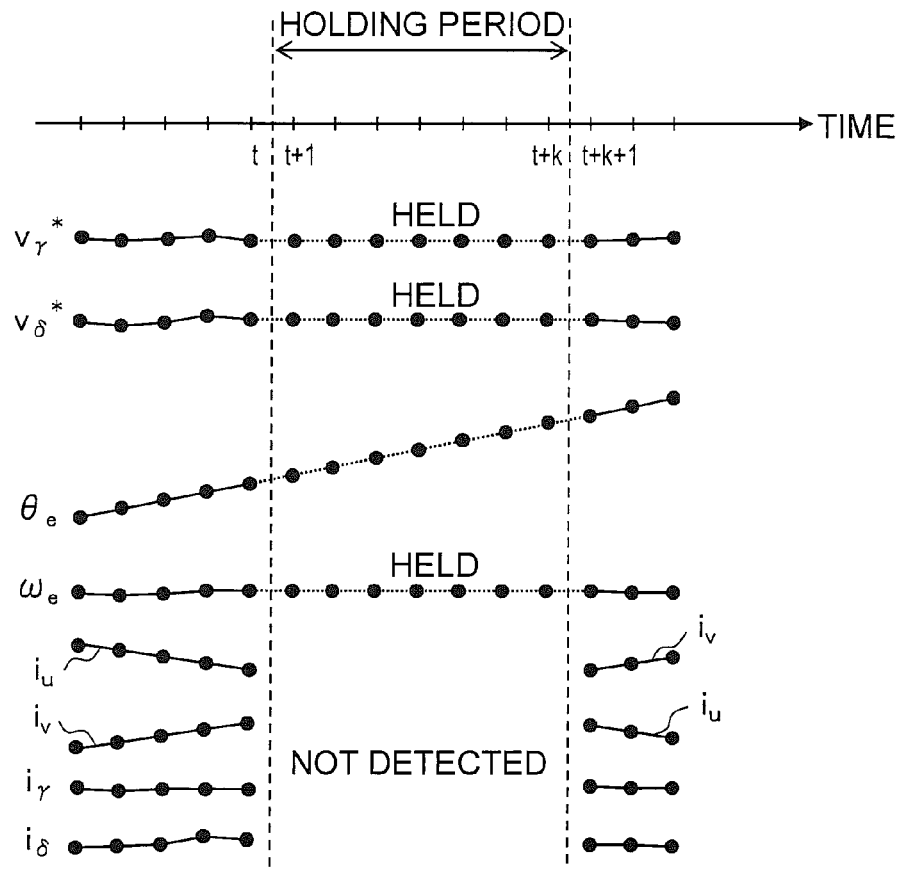
FIG. 11 is a diagram showing how the specified values and state quantities produced in the controller shown in FIG. 9 transition.

With reference to FIG. 11, the operation of the controller 3 before and after a particular holding period will be described more specifically, with attention focused on that particular holding period. FIG. 11 illustrates how $v_\gamma^*$, $v_\delta^*$, $\theta_e$, $\omega_e$, $i_u$, $i_v$, $i_\gamma$, and $i_\delta$ change, with the horizontal axis representing time, showing the transition from a state in which the U-phase voltage is the maximum phase and the V-phase voltage is the intermediate phase to a state in which the U-phase voltage is the intermediate phase and the V-phase voltage is the maximum phase. The following description assumes that $v_\gamma^*$, $v_\delta^*$, $\theta_e$, $\omega_e$, $i_u$, $i_v$, $i_\gamma$, and $i_\delta$ are discrete values that are updated at intervals of a predetermined period. Then, $v_\gamma^*$, $v_\delta^*$, $\theta_e$, $\omega_e$, $i_u$, $i_v$, $i_\gamma$, and $i_\delta$ at an update time point t are represented by $v_\gamma^*[t]$, $v_\delta^*[t]$, $\theta_e[t]$, $\omega_e[t]$, $i_u[t]$, $i_v[t]$, $i_\gamma[t]$ and $i_\delta[t]$, respectively. Likewise, $\omega^*$, $i_\gamma^*$, $i_\delta^*$, $v_u^*$, $v_v^*$, and $v_w^*$ at the update time point t are represented by $\omega^*[t]$, $i_\gamma^*[t]$, $i_{\delta^*[t]}$, $v_u^*[t]$, $v_v^*[t]$, and $v_w^*[t]$, respectively. It is to be understood that the update time point does not mean an instantaneous time point, but does mean a time concept having a given width with consideration given to operation time or the like. The length of a period between the update time point t and the next update time point (t+1) corresponds to the aforementioned predetermined period.

Based on $i_u[t]$, $i_v[t]$, and $\theta_e[t-1]$, $i_\gamma[t]$ and $i_\delta[t]$ are calculated; based on $i_\gamma[t]$, $i_\delta[t]$, $v_\gamma^*[t-1]$, and $v_\delta^*[t-1]$, $\theta_e[t]$ and $\omega_e[t]$ are calculated; and, based on $\omega^*[t]$ and $\omega_e[t]$, $i_\gamma^*[t]$ and $i_\delta^*[t]$ are calculated. The current controller 24 calculates $v_\gamma^*[t]$ and $v_\delta^*[t]$ based on $i_\gamma^*[t]$, $i_\delta^*[t]$, $i_\gamma[t]$, and $i_\delta[t]$. The coordinate converter 27 calculates $v_u^*[t]$, $v_v^*[t]$, and $v_w^*[t]$ based on $\theta_e[t]$ and $v_\gamma^*[t]$ and $v_\delta^*[t]$ fed thereto.

Suppose that a period on or before the update time point t is not included in a particular holding period, and the holding period setting portion 25 determines that a period from an update time point (t+1) onward is included in the particular holding period based on $v_u^*[t]$, $v_v^*[t]$, and $v_w^*[t]$ and that the particular holding period ends at an update time point (t+k). That is, a period from the update time point (t+1) to the update time point (t+k) is included in one holding period, and a period from the update time point (t+k+1) onward is not included in this holding period. Here, k is an integer equal to or greater than 2.

In this case, at the update time point t, $i_u[t]$ and $i_v[t]$ are calculated by the actual measurement using the current sensor 5, $i_\gamma[t]$ and $i_\delta[t]$ are calculated, and $\theta_e[t]$ and $\omega_e[t]$ are then calculated. After $i_\gamma^*[t]$ and $i_\delta^*[t]$ are calculated by the speed controller 23, $v_\gamma^*[t]$ and $v_\delta^*[t]$ calculated by the current controller 24 are fed, as they are, to the coordinate converter 27 via the specified voltage value holding portion 26. According to $v_\gamma^*[t]$ and $v_\delta^*[t]$ thus received, the coordinate converter 27 calculates $v_u^*[t]$, $v_v^*[t]$, and $v_w^*[t]$.

In the holding period, the output signal of the current sensor 5 is not sampled, and $i_u$, $i_v$, $i_\gamma$, and $i_\delta$ are not calculated. It is to be noted that, even in the holding period, the output signal of the current sensor 5 may be sampled (without calculating values such as $i_u$ according to the sampled value thus obtained).

In the holding period, the estimator 28 temporarily stops estimating $\theta_e$ and $\omega_e$ based on $i_\gamma$ and $i_\delta$. Instead, the estimator 28 estimates $\theta_e$ in the holding period such that $\theta_e$ is made to change in accordance with changes in $\theta_e$ observed on or before the update time point t or in accordance with the rotation speed information obtained on or before the update time point t. The rotation speed information obtained on or before the update time point t includes $\omega_e[t]$ or $\omega^*[t]$. In a steady state, $\omega_e[t]$ is almost the same as $\omega^*[t]$. Since $\omega_e[t]$ is calculated based on the amount of change in $\theta_e$ observed on or before the update time point t per unit time, "estimating $\theta_e$ in the holding period in accordance with $\omega_e[t]$" is considered to be equivalent to "estimating $\theta_e$ in the holding period in accordance with changes in $\theta_e$ observed on or before the update time point t", and the former produces the same results as the latter.

Specifically, for example, $\theta_e$ in the holding period (that is, $\theta_e[t+1]$ to $\theta_e[t+k]$) is estimated based on $\theta_e[t]$ on the presumption that the rotor 6 keeps rotating at a rotation speed of $\omega_e[t]$ or $\omega^*[t]$ in the holding period. Therefore, $\omega_e$ in the holding period (that is, $\omega_e[t+1]$ to $\omega_e[t+k]$) is regarded as the same as $\omega_e[t]$. The rotor position and rotation speed (such as $\theta_e[t+1]$ and $\omega_e[t+1]$) estimated in the holding period are outputted to the coordinate converter 27 and the speed controller 23. Since the rotor keeps rotating at a constant rate in a steady state, estimating $\omega_e$ and $\omega_e$ in the holding period in the above-described manner presents little problem.

The specified voltage value holding portion 26 holds $v_\gamma^*$ and $v_\delta^*$ outputted from the current controller 24 immediately before the holding period. That is, the specified voltage value holding portion 26 holds $v_\gamma^*[t]$ and $v_\delta^*[t]$, and continuously outputs them in the holding period. Therefore, $v_\gamma^*$ and $v_\delta^*$ (that is, $v_\gamma^*[t+1]$ to $v_\gamma^*[t+k]$ and $v_\delta^*[t+1]$ to $v_\delta^*[t+k]$) fed to the coordinate converter 27 from the update time point (t+1) to the update time point (t+k) are the same as $v_\gamma^*[t]$ and $v_\delta^*[t]$ outputted from the current controller 24 immediately before the holding period.

After the holding period is over, the operation is restored to that performed before the holding period is started. That is, at the update time point (t+k+1) following the end of the holding period, $i_u[t+k+1]$ and $i_v[t+k+1]$ are calculated by the actual measurement using the current sensor 5, $i_\gamma[t+k+1]$ and $i_\delta[t+k+1]$ are calculated, and $\theta_e[t+k+1]$ and $\omega_e[t+k+1]$ are then calculated in such a way as to establish continuity with $\theta_e[t+k]$ and $\omega_e[t+k]$. After $i_\gamma^*[t+k+1]$ and $i_\delta^*[t+k+1]$ are calculated by the speed controller 23, $v_\gamma^*[t+k+1]$ and $v_\delta^*[t+k+1]$, which are calculated by the current controller 24 by using $i_\gamma[t+k+1]$, $i_\delta[t+k+1]$, $i_\gamma^*[t+k+1]$, and $i_\delta^*[t+k+1]$, are outputted, as they are, to the coordinate converter 27 via the specified voltage value holding portion 26. According to $v_\gamma^*[t+k+1]$ and $v_\delta^*[t+k+1]$ thus received, the coordinate converter 27 calculates $v_u^*[t+k+1]$, $v_v^*[t+k+1]$, and $v_w^*[t+k+1]$. The same holds true for a period from an update time point (t+k+2) onward.

Figure 12:
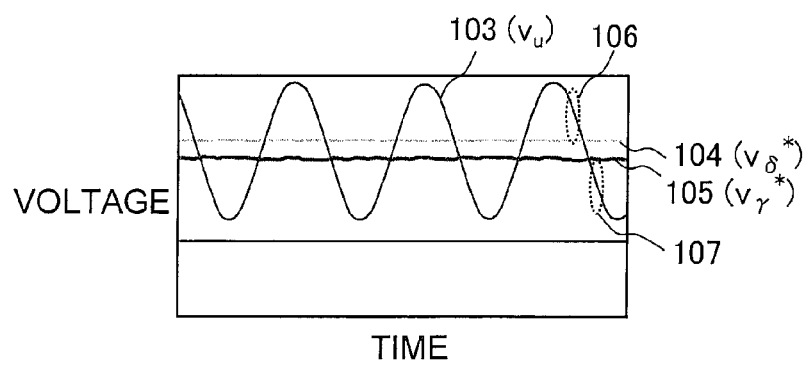
FIG. 12 is a diagram showing the voltage waveform observed in the motor drive system shown in FIG. 9.
Figure 20:
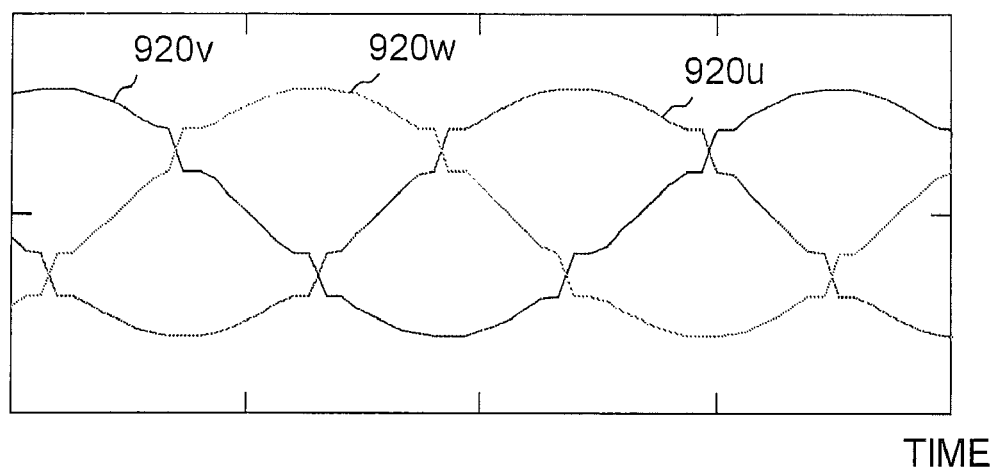
FIG. 20 is a diagram showing, as a conventional technology, an example of how to correct a specified voltage value (pulse width) in a case where the single shunt current detection technique is employed.

The voltage waveform observed when the holding operation described above is performed is shown in FIG. 12. In FIG. 12, the horizontal axis represents time, reference character 103 represents the voltage waveform of the U-phase voltage $v_u$, reference character 104 represents the waveform of $v_\delta^*$, and reference character 105 represents the waveform of $v_\gamma^*$. The holding period is located in an area 106 encircled with broken lines and in an area 107 encircled with broken lines. As will be understood from this figure, the obtained U-phase voltage $v_u$ is a smooth, distortion-free voltage. That is, unlike the method for correcting the pulse width (see FIG. 20), there is no possibility that voltage distortion (discontinuity in specified voltage) occurs. This makes it possible to achieve smooth driving of the motor 1. Since the rotor keeps rotating at a constant rate in a steady state, estimating $\theta_e$ in the holding period in the above-described manner gives each phase voltage a nearly ideal voltage waveform. This helps reduce vibration and noise in the motor drive system and hence in refrigerator compressors and air-conditioning apparatuses (in particular, for example, in-vehicle air-conditioning apparatuses) provided therewith.

A conventional method described in JP-A-2004-64903 requires a complicated calculation process for re-converting d-q axes currents into three-phase currents in the unmeasurable time period, the d-q axes currents obtained by performing dq conversion on the three-phase currents obtained before the unmeasurable time period. Such a complicated calculation process is not required in this example. Let the symbols used in this embodiment be applied to this conventional method. Then, in this conventional method, a calculation process is required in which the speed controller and the current controller calculate, in the unmeasurable time period, $i_\gamma^*$, $i_\delta^*$, $v_\gamma^*$, and $v_\delta^*$ based on $i_\gamma$ and $i_\delta$ obtained before the unmeasurable time period. In the course of performing this calculation process, a calculation error unintentionally occurs. On the other hand, this example eliminates the possibility of occurrence of such a calculation error, making it possible to perform vector control of the motor 1 with a higher degree of accuracy. In addition, in this example, it is possible to stop a calculation process of the speed controller 23 and the current controller 24 in the holding period, which results in a beneficial reduction of control processing time.

Furthermore, in this example, unlike the methods described in JP-A-2005-45848, JP-A-2003-224982, and JP-A-2004-104977, there is no need for changing the carrier frequency (the frequency of the carrier signal). Complicated processing using a high-performance microcomputer is required to make the carrier frequency changeable. In addition, when the carrier frequency is reduced, problems arise, such as slowing of control cycle or an increase in noise. In this example, such problems do not arise.

Moreover, in the holding period, there is no need for sampling the output signal of the current sensor 5 and calculating the sampling time point, it is possible to enhance the speed of processing.

The descriptions heretofore deal with an example in which the specified voltage value holding portion 26 holds $v_\gamma^*$ and $v_\delta^*$ outputted from the current controller 24 immediately before the holding period, that is, $v_\gamma^*[t]$ and $v_\delta^*[t]$, and continuously outputs them in the holding period. However, the specified voltage value held by the specified voltage value holding portion 26 and outputted therefrom in the holding period does not necessarily have to be $v_\gamma^*[t]$ and $v_\delta[t]$. For example, it is simply necessary for the specified voltage value holding portion 26 to hold $v_\gamma^*[t-j]$ and $v_\delta^*[t-j]$ outputted from the current controller 24 before the holding period, and continuously output them in the holding period. Although in this case j is an integer equal to or greater than 1, it is preferable that the value of j be as small as possible, because $v_\gamma^*$ and $v_\delta^*$ should be calculated based on the values measured by the current sensor 5; most preferably, j is equal to 0, just as described in the example above.

The descriptions heretofore can be summarized as follows. The specified voltage value holding portion 26 holds $v_\gamma$ and $v_\delta^*$ outputted from the current controller 24 before a particular holding period, that is, $v_\gamma^*[t-j]$ and $v_\delta^*[t-j]$, and continuously outputs them in the particular holding period (here, j is an integer equal to or greater than 0, and is previously set as a fixed value, for example). More specifically, the specified voltage value holding portion 26 holds $v_\gamma^*[t-j]$ and $v_\delta^*[t-j]$, the values outputted from the current controller 24 at a particular time point before the holding period, the particular time point determined relative to a time point from which the holding period begins, and continuously outputs them in the holding period. In this case, $v_\gamma$ and $v_\delta^*$ fed to the coordinate converter 27 from the update time point (t+1) to the update time point (t+k) (that is, $v_\gamma^*[t+1]$ to $v_\gamma^*[t+k]$ and $v_\delta^*[t+1]$ to $v_\delta[t+k]$) are the same as $v_\gamma^*[t-j]$ and $v_\delta^*[t-j]$ outputted from the current controller 24.

Methods for Setting the Holding Period

How the holding period setting portion 25 sets the holding period will be explained. Examples of such a setting method are first and second setting methods. The holding period setting portion 25 can adopt either the first or second setting method.

First, the first setting method will be explained. In the first setting method, irrespective of whether or not the present time is within the holding period, the holding period setting portion 25 determines whether or not the voltage difference between two phases is equal to or smaller than the aforementioned lower limit threshold value $V_{LIM}$ based on the specified three-phase voltage values ($v_u^*$, $v_v^*$, and $v_w^*$) at all times, and includes a period during which the voltage difference between two phases is equal to or smaller than the lower limit threshold value $V_{LIM}$ in the holding period.

Next, the second setting method will be explained. In the second setting method, outside the holding period, the holding period setting portion 25 determines whether or not the voltage difference between two phases is equal to or smaller than the lower limit threshold value $V_{LIM}$ based on the specified three-phase voltage values ($v_u^*$, $v_v^*$, and $v_w^*$), and sets a time point (or a time point a little before that time point) at which a transition is made from a state in which the voltage difference between two phases is greater than the lower limit threshold value $V_{LIM}$ to a state in which the voltage difference between two phases is equal to or smaller than the lower limit threshold value $V_{LIM}$ as a start point of the holding period.

The holding period setting portion 25 sets the length of the holding period based on the rotation speed information ($\omega_e$ or $\omega^*$) obtained at the start point of the holding period. This is because, since the rotor keeps rotating at a constant rate in a steady state, it is possible to estimate, based on the rotation speed information, how much time elapses until the voltage difference between two phases becomes greater than the lower limit threshold value $V_{LIM}$ again. Once the start point and length of the holding period are set, the end point of the holding period is automatically determined.

Incidentally, even if a period during which the voltage difference between two phases is greater than the lower limit threshold value $V_{LIM}$ and the holding period slightly overlap each other, it matters little because the voltage waveform shown in FIG. 12 can be obtained. This holds true both for the first and second setting methods, and also true for a third setting method, which will be explained later.

EXAMPLE 2

Example 1 deals with the first and second setting methods as an example of the holding period setting method. Instead, it is also possible to use a third setting method. As an example using the third setting method, Example 2 will be described. Example 2 differs from Example 1 in the holding period setting method. In other respects, Examples 1 and 2 are the same. Therefore, in the following description, explanations will be given with emphasis placed on the holding period setting method of Example 2.

First, axes related to the third setting method are defined, and formulae related thereto are derived.

Figure 13:
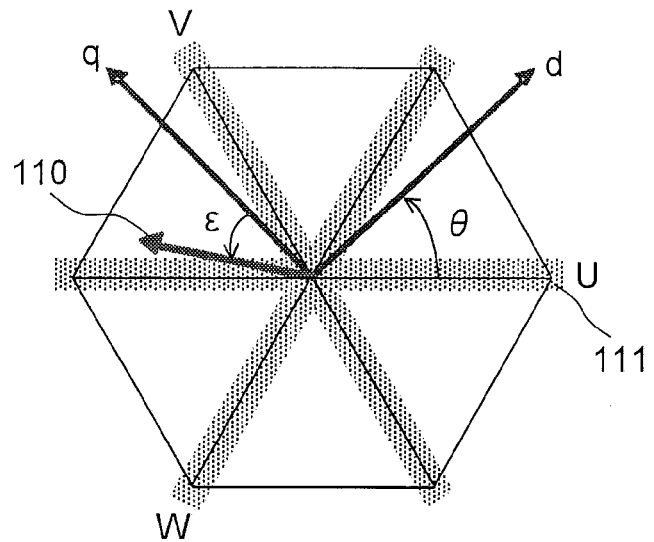
FIG. 13 is a spatial vector diagram according to Example 2 of the invention, the spatial vector diagram showing a relationship among fixed axes including a U-phase axis, a V-phase axis, and a W-phase axis, rotation axes including a d-axis and a q-axis, and voltage vector.

FIG. 13 is a spatial vector diagram showing a relationship among fixed axes including the U-phase axis, the V-phase axis, and the W-phase axis, rotation axes including the d-axis and the q-axis, and voltage vector. A vector represented by reference numeral 110 is the voltage vector. The phase of the voltage vector 110 relative to the q-axis is represented by $\epsilon$. The phase of the voltage vector 110 relative to the U-phase axis is represented by ($\theta+\epsilon+\pi/2$).

The voltage vector 110 is the voltage that is applied to the motor 1 and viewed as a vector. For example, if attention is focused on the $\gamma$-$\delta$ coordinates, the $\gamma$-axis component and the $\delta$-axis component of the voltage vector 110 are $v_\gamma$ and $v_\delta$, respectively. In actuality, in the motor drive system, the specified $\gamma$-axis voltage value $v_\gamma^*$ and the specified $\delta$-axis voltage value $v_\delta^*$ are calculated, and the voltage vector 110 is represented by using $v_\gamma^*$ and $v_\delta^*$. Therefore, the voltage vector can also be referred to as a specified voltage vector.

Hatched areas 111 that are shaped like an asterisk and include an area near the U-phase axis, an area near the V-phase axis, and an area near the W-phase axis each represent an area in which two phase currents cannot be detected. For example, in a case where two phase currents cannot be detected due to closeness of voltage levels of the V-phase voltage and the W-phase voltage, the voltage vector 110 is located near the U-phase axis; in a case where two phase currents cannot be detected due to closeness of voltage levels of the U-phase voltage and the W-phase voltage, the voltage vector 110 is located near the V-phase axis.

As described above, the areas 111 in which two phase currents cannot be detected are spaced an electrical angle of 60 degrees apart relative to the U-phase axis. If the voltage vector 110 is located in any of the areas 111, two phase currents cannot be detected. Therefore, by determining whether or not the voltage vector (specified voltage vector) at a particular time point is located in any of the areas 111, it is possible to determine whether or not that particular time point should be included in the holding period.

Figure 14:
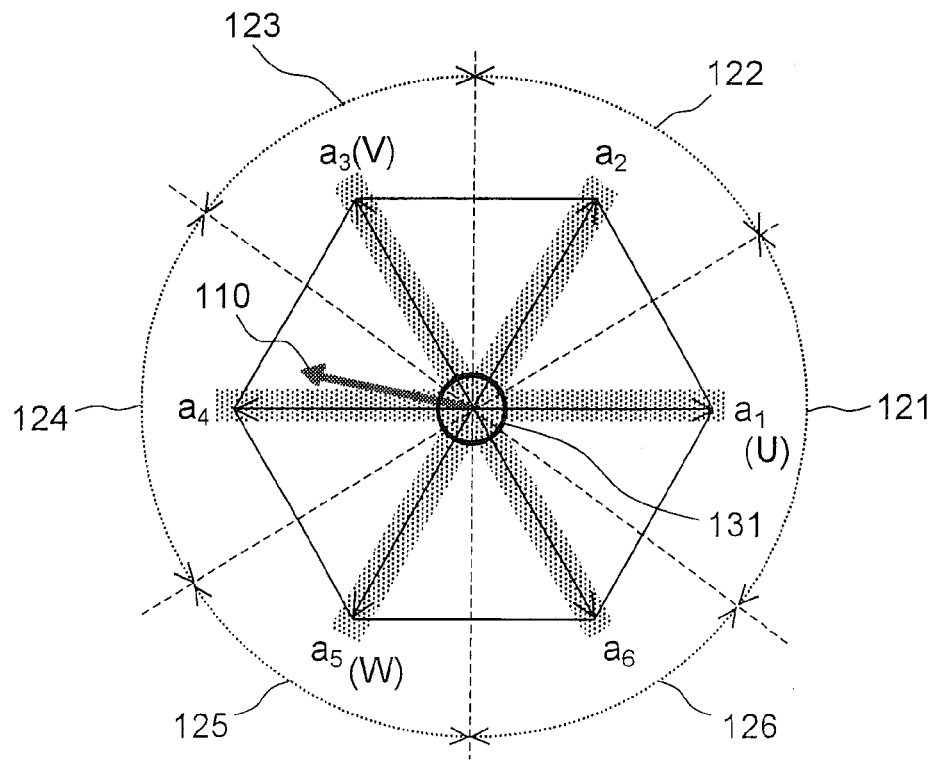
FIG. 14 is a diagram for explaining an a-axis defined in Example 2 of the invention.

This determination is made possible as follows. Now, exploiting the characteristics of the areas 111 in which two phase currents cannot be detected, assume that there are the coordinates that rotate every 60 degrees in electrical angle in a step-like manner. Then, these coordinates are referred to as the a-b coordinates (incidentally, the d-q and $\gamma$-$\delta$ coordinates rotate in a continuous manner). The a-b coordinates have, as their coordinate axes, the a- and b-axes at right angles to each other. FIG. 14 shows six potential a-axes. The a-axis can be any one of $a_1$- to $a_6$-axes according to the phase ($\theta+\epsilon+\pi/2$) of the voltage vector 110. The $a_1$-, $a_3$-, and $a_5$-axes coincide with the U-, V-, and W-phase axes, respectively. The $a_2$-, $a_4$-, and $a_6$-axes correspond to an axis intermediate between the $a_1$- and $a_3$-axes, an axis intermediate between the $a_3$- and $a_5$-axes, and an axis intermediate between the $a_5$- and $a_1$-axes, respectively. A circle represented by reference numeral 131 will be described later.

If the voltage vector 110 is located in a region represented by reference numeral 121, that is, if $11\pi/6 \leq (\theta+\epsilon+\pi/2) < 0$ or $0 \leq (\theta+\epsilon+\pi/2) < \pi/6$ holds, the a-axis is the $a_1$-axis. If the voltage vector 110 is located in a region represented by reference numeral 122, that is, if $\pi/6 \leq (\theta+\epsilon+\pi/2) < \pi/2$ holds, the a-axis is the $a_2$-axis. If the voltage vector 110 is located in a region represented by reference numeral 123, that is, if $\pi/2 \leq (\theta+\epsilon+\pi/2) < 5\pi/6$ holds, the a-axis is the $a_3$-axis. If the voltage vector 110 is located in a region represented by reference numeral 124, that is, if $5\pi/6 \leq (\theta+\epsilon+\pi/2) < 7\pi/6$ holds, the a-axis is the $a_4$-axis. If the voltage vector 110 is located in a region represented by reference numeral 125, that is, if $7\pi/6 \leq (\theta+\epsilon+\pi/2) < 3\pi/2$ holds, the a-axis is the $a_5$-axis. If the voltage vector 110 is located in a region represented by reference numeral 126, that is, if $3\pi/2 \leq (\theta+\epsilon+\pi/2) < 11\pi/6$ holds, the a-axis is the $a_6$-axis. For example, in a case where the voltage vector 110 lies in a position shown in FIG. 14, the a-axis is the $a_4$-axis.

As described above, the a-axis rotates every 60 degrees in a step-like manner as the voltage vector rotates, and the b-axis also rotates every 60 degrees along with the a-axis in a step-like manner, forming a right angle with the a-axis. The a- and b-axes can be expressed as the coordinate axes that rotate every 60 degrees and that are quantized with a rotation angle of 60 degrees. As a result, the a-axis is always located at the center of the area in which two phase currents cannot be detected.

Figure 15:
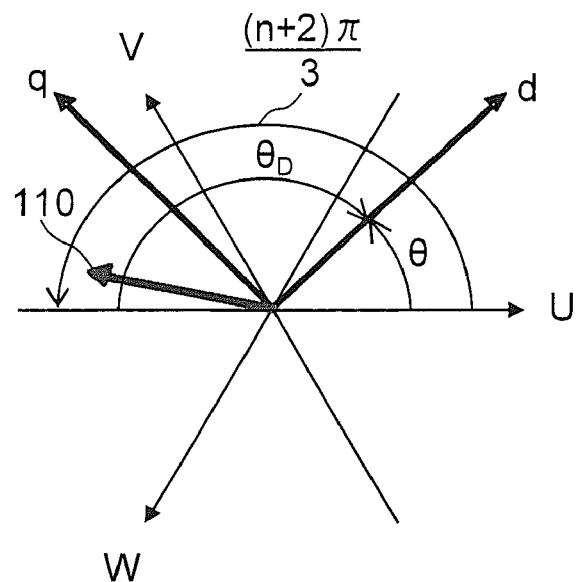
FIG. 15 is a diagram showing how the phase (θ) of the rotor is broken down with consideration given to the relationship with the a-axis explained in FIG. 14.

A description will be given below of formulae related to the a-b coordinates. The phase of one of the $a_1$- to $a_6$-axes, the one nearest to the voltage vector 110, is expressed as "$(n+2)\pi/3$" relative to the U-phase axis, wherein n is a quotient obtained by dividing ($\theta+\epsilon$) by $\pi/3$. For the sake of convenience, as shown in FIG. 15, $\theta$ is broken down into the aforementioned phase $(n+2)\pi/3$ and the phase difference $\theta_D$ between the phase $(n+2)\pi/3$ and $\theta$. A relationship among these phases is given by formulae (1-1) and (1-2) below.

$$\theta + \varepsilon = \frac{n\pi}{3} + \alpha, \left(\text{where } 0 \leq \alpha < \frac{\pi}{3}\right) \quad (1\text{-}1)$$

$$\theta = \theta_D + \frac{(n+2)\pi}{3} \quad (1\text{-}2)$$

Assume that the voltage vector 110 is a voltage vector in the a-b coordinates obtained by subjecting the d-q coordinates to coordinate conversion by the phase difference $\theta_D$, and the voltage vector 110 in the a-b coordinates has, as its a-axis and b-axis components, the a-axis voltage $v_a$ and the b-axis voltage $v_b$. Then, the d-axis voltage $v_d$, the q-axis voltage $v_q$, the a-axis voltage $v_a$, and the b-axis voltage $v_b$ satisfy the coordinate conversion formula (1-3) below.

$$\begin{pmatrix} v_a \\ v_b \end{pmatrix} = \begin{bmatrix} \cos\theta_D & -\sin\theta_D \\ \sin\theta_D & \cos\theta_D \end{bmatrix} \begin{pmatrix} v_d \\ v_q \end{pmatrix} \quad (1\text{-}3)$$

The phase difference $\theta_D$ can be calculated as follows. By referring to $\theta$, n (i.e., a quotient obtained by dividing ($\theta+\epsilon$) by $\pi/3$) which matches $\epsilon$ given by formula (1-4) below is obtained. Substituting n thus obtained and $\theta$ in formula (1-2) above gives the phase difference $\theta_D$.

$$\varepsilon = \tan^{-1}\left(\frac{-v_d}{v_q}\right) \quad (1\text{-}4)$$

Since the a-axis is always located at the center of the area in which two phase currents cannot be detected, a determination as to whether or not the voltage vector (specified voltage vector) is located in the areas 111 is made possible by performing coordinate conversion so that the voltage vector in the d-q coordinates is converted into the one in the a-b coordinates, and then referring to the a-axis and b-axis components of the voltage vector in the a-b coordinates. In a case where the voltage vector 110 lies within the circle 131, the voltage levels of three phase voltages are close to one another. Also in this case, it is impossible to detect two phase currents.

Figure 16:
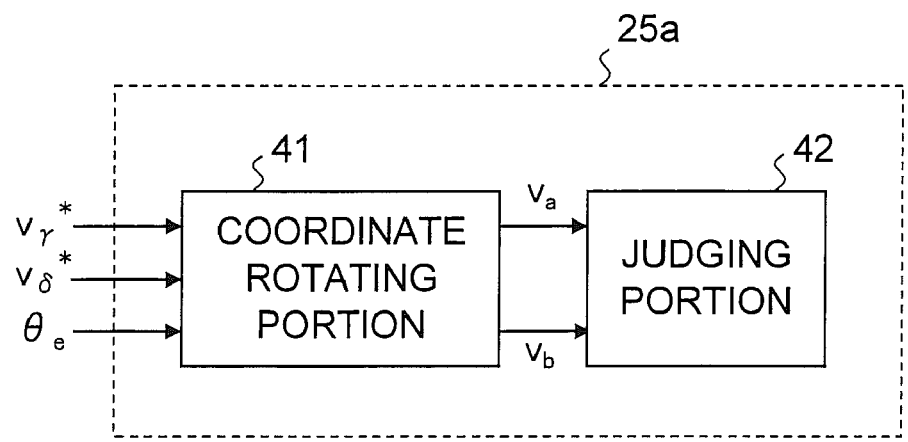
FIG. 16 is an internal block diagram of a holding period setting portion according to Example 2 of the invention.

FIG. 16 is an internal block diagram of a holding period setting portion 25a according to Example 2. In Example 2, in place of the holding period setting portion 25 shown in FIG. 9, the holding period setting portion 25a is used. The holding period setting portion 25a includes a coordinate rotating portion 41 and a judging portion 42. In the holding period setting portion 25a, $v_\gamma^*$ and $v_\delta^*$ outputted from the specified voltage value holding portion 26 and $\theta_e$ outputted from the estimator 28 are used as $v_d$, $v_q$, and $\theta$, respectively, in formulae such as formulae (1-1) to (1-4) above.

The coordinate rotating portion 41 performs coordinate conversion according to formula (1-3) above on $v_\gamma^*$ and $v_\delta^*$ outputted from the specified voltage value holding portion 26 by using $\theta_e$ outputted from the estimator 28, and obtains the a-axis voltage $v_a$ and the b-axis voltage $V_b$. When calculating the phase difference $\theta_D$ in formula (1-3) above, the aforementioned method using formula (1-4) above is used.

Based on the a-axis voltage $v_a$ and the b-axis voltage $v_b$ obtained by the coordinate rotating portion 41, the judging portion 42 makes a judgment on the voltage difference between two phases. Specifically, the judging portion 42 makes a judgment as to whether or not the magnitude (absolute value) of the b-axis voltage $v_b$ is smaller than a predetermined threshold value $\Delta$ (where $\Delta>0$). That is, the judging portion 42 makes a judgment as to whether or not formula (1-5) below holds (see FIG. 17 for the significance of the threshold value $\Delta$). In addition, the judging portion 42 makes a judgment as to whether or not the a-axis voltage $v_a$ satisfies formula (1-6) below.

$$|v_b|<\Delta \quad (1\text{-}5)$$

$$v_a<\sqrt{3}\Delta \quad (1\text{-}6)$$

Figure 17:
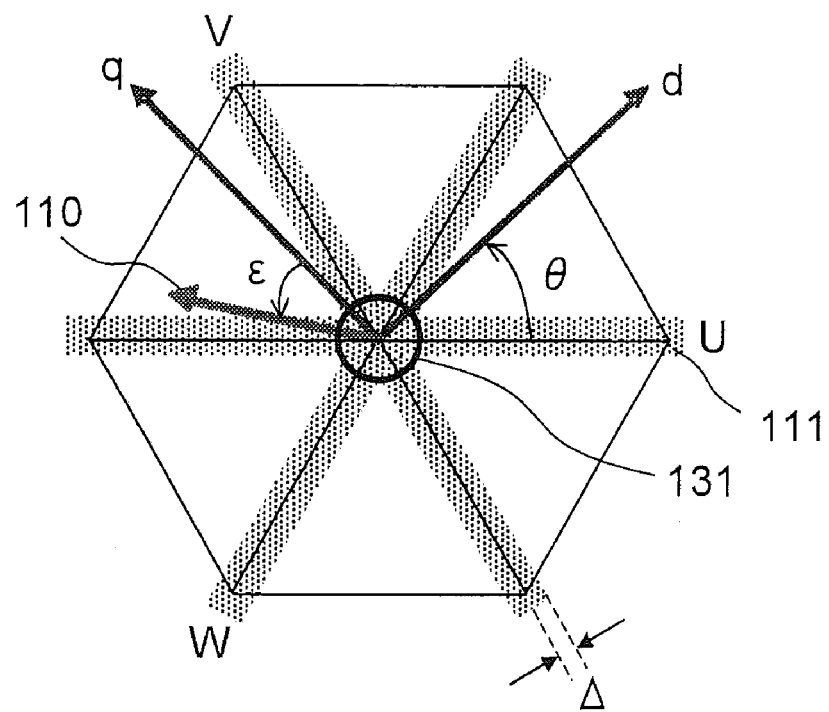
FIG. 17 is a diagram showing, on the spatial vector diagram, a threshold value (Δ) used as a reference by the holding period setting portion according to Example 2 of the invention

Since the b-axis voltage $v_b$ is an orthogonal component relative to the a-axis voltage $v_a$, if formula (1-5) holds, the terminal point of the specified voltage vector represented by $v_\gamma$ and $v_\delta^*$ lies within the areas 111 in which two phase currents cannot be detected (see FIG. 17). If formula (1-6) holds, the terminal point of the specified voltage vector represented by $v_\gamma^*$ and $v_\delta^*$ lies within the circle 131 shown in FIG. 14 (or FIG. 17). Therefore, if at least one of formulae (1-5) and (1-6) holds, the judging portion 42 judges that the voltage difference between two phases is equal to or smaller than the aforementioned lower limit threshold value $V_{LIM}$; if neither formula (1-5) nor formula (1-6) holds, the judging portion 42 judges that the voltage difference between two phases is greater than the lower limit threshold value $V_{LIM}$.

The holding period setting portion 25a sets the holding period in such a way that the period during which the voltage difference between two phases is equal to or smaller than the lower limit threshold value $V_{LIM}$ is included in the holding period. In Example 2, the different parts (the specified voltage value holding portion 26, the estimator 28, and the like) provided in the motor drive system operate in accordance with the holding period set by the holding period setting portion 25a.

It is needless to say that the same effects as those achieved in Example 1 can be achieved by setting the holding period in the manner described in Example 2.

EXAMPLE 3

Examples 1 and 2 deal with the motor drive systems in which vector control is performed such that the axis error $\Delta\theta$ between the d- and $\gamma$-axes is made to converge to zero, that is, such that the $\gamma$-axis is made to follow the d-axis; however, Examples 1 and 2 may be modified to be Example 3 in which vector control is performed such that the $\gamma$-axis is made to follow an axis other than the d-axis. For example, by defining a dm-axis described in the treatise titled "Position Sensorless Vector Control for Permanent Magnet Synchronous Motors Based on Maximum Torque Control Frame" by Hida et al.; published by the Industry Applications Society of the Institute of Electrical Engineers of Japan; included in the Collection of the Lecture Treatises Presented at the 2006 Annual Conference of the Industry Applications Society of the Institute of Electrical Engineers of Japan; pp. 385-388 (1-385-I-388); August 2006 and JP-A-2007-259686, vector control may be performed such that the $\gamma$-axis is made to follow the dm-axis.

The dm-axis is an axis that lags behind the qm-axis by an electrical angle of 90 degrees. The qm-axis is the rotation axis whose direction coincides with that of the current vector to be fed to the motor 1 when maximum torque control is achieved. The current vector to be fed to the motor 1 is the current to be fed to the motor 1 and expressed in vector form. Alternatively, the qm-axis may be the rotation axis having a phase leading the rotation axis whose direction coincides with that of the current vector to be fed to the motor 1 when maximum torque control is achieved.

In a case where vector control is performed such that the $\gamma$-axis is made to follow the dm-axis, it is necessary simply to perform the following processing, for example. Outside the holding period, the estimator 28 shown in FIG. 9 estimates the axis error $\Delta\theta_m$ between the dm- and $\gamma$-axes by using all or part of $i_\gamma$ and $i_\delta$ outputted from the coordinate converter 22 and $v_\gamma^*$ and $v_\delta^*$ outputted from the current controller 24, and estimates the rotor position $\theta_e$ and the rotation speed $\omega_e$ such that the axis error $\Delta\theta_m$ is made to converge to zero by using proportional-plus-integral control. The operation performed in the holding period is the same as those of Examples 1 and 2.

EXAMPLE 4

Examples 1 to 3 deal with the motor drive systems in which position sensorless vector control is performed that uses no position sensor for detecting the rotor position. However, the techniques described in Examples 1 to 3 are useful in a case where the position sensor is provided. As Example 4 of the invention, a description will be given below of a motor drive system provided with the position sensor. Any feature of Examples 1 to 3 can be applied, unless inconsistent, to Example 4.

Figure 18:
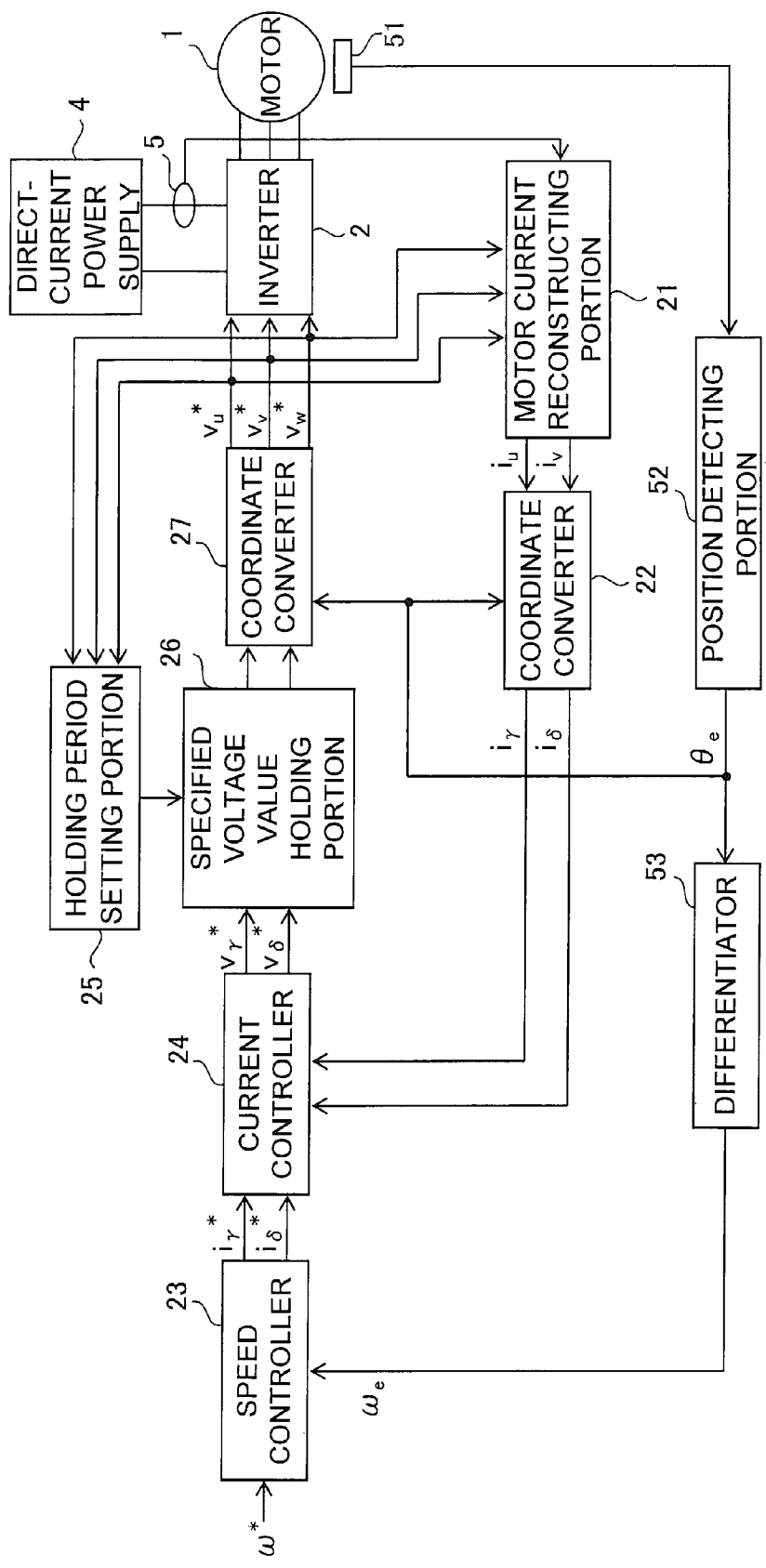
FIG. 18 is a detailed block diagram of a motor drive system according to Example 4 of the invention.
Figure 19:
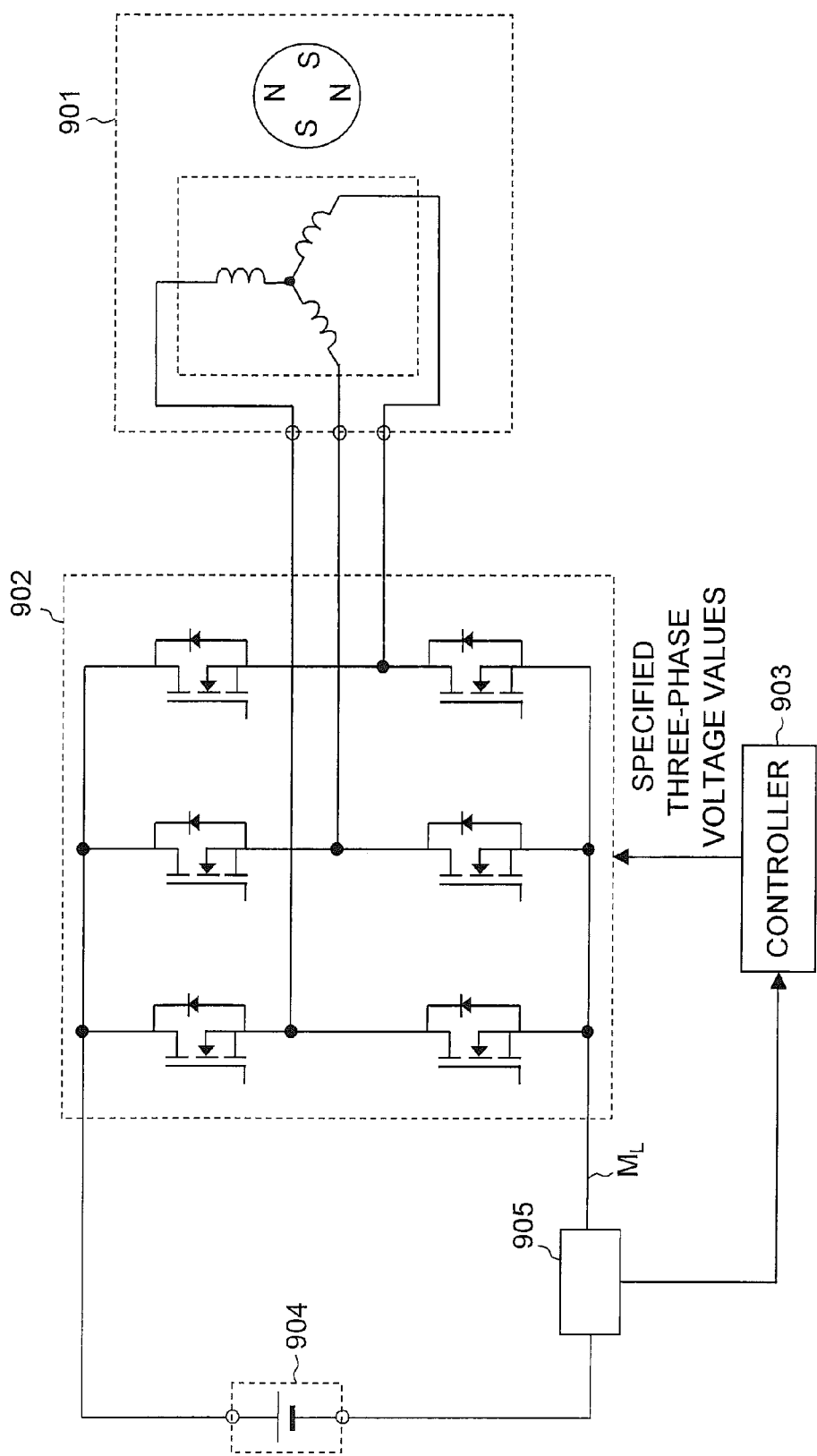
FIG. 19 is a block diagram showing the overall configuration of a conventional motor drive system employing a single shunt current detection technique.

For the sake of concreteness, a description will be given below of a configuration of a motor drive system that differs from the motor drive system shown in FIG. 9 according to Example 1 in that a position sensor and a position detecting portion are further added. FIG. 18 is a block diagram of the motor drive system having this configuration. This motor drive system differs from the motor drive system shown in FIG. 9 in that $\theta_e$ and $\omega_e$ are detected based on the output signal of the position sensor, and that this eliminates the need for the estimator 28. In other respects, this motor drive system is the same as that shown in FIG. 9.

The position sensor 51 is realized with, for example, Hall devices or resolvers, and outputs a signal for specifying the magnetic pole position of the permanent magnet 6a of the rotor 6 (that is, a signal for specifying the angle $\theta$). The position detecting portion 52 detects the phase of the d-axis, relative to the U-phase armature winding fixed axis, based on the output signal of the position sensor 51. The phase (rotor position) thus detected is treated as $\theta_e$. The rotor position $\theta_e$ detected by the position detecting portion 52 is, ideally, equal to $\theta$ shown in FIG. 8, and is fed to the coordinate converters 22 and 27. The rotor position $\theta_e$ is differentiated by the differentiator 53 to obtain $\omega_e$, and $\omega_e$ thus obtained is fed to the speed controller 23.

As is the case with Example 1, the specified voltage value holding portion 26 holds $v_\gamma^*$ and $v_\delta^*$ outputted from the current controller 24 at a particular time point. Outside the holding period, the specified voltage value holding portion 26 outputs $v_\gamma^*$ and $v_\delta^*$ the current controller 24 is outputting, as they are, to the coordinate converter 27. Within the holding period, the specified voltage value holding portion 26 outputs $v_\gamma^*$ and $v_\delta^*$ held thereby to the coordinate converter 27. As a result of the position sensor 51 being used, the rotor position $\theta_e$ is always detected irrespective of whether or not the present time is within the holding period. Therefore, the coordinate converter 27 performs, based on the rotor position $\theta_e$ detected based on the output signal of the position sensor 51 at all times, coordinate conversion so that $v_\gamma^*$ and $v_\delta^*$ fed from the specified voltage value holding portion 26 are converted into those on the three-phase fixed coordinate axes, and thereby calculates the specified three-phase voltage values ($v_u^*$, $v_v^*$, and $v_w^*$) and outputs them.

It is needless to say that the same effects (such as obtaining a smooth voltage waveform of the phase voltage) as those achieved in Example 1 can be achieved by configuring the motor drive system as in Example 4.

Modifications and Variations

Hereinafter, notes 1 to 4 will be described as modified examples of the embodiment described above or annotations made thereon. Any feature of notes 1 to 4 described below can be applied, unless inconsistent, to any note other than that in connection with which the feature is specifically described.

Note 1

What has been described above deals with a case in which three-phase modulation is performed in the inverter 2; however, the modulation method used in the present invention is not limited to three phase modulation. For example, in a case where two-phase modulation is performed in the inverter 2, the energizing patterns are different from those of three-phase modulation shown in FIG. 3. In two-phase modulation, since the lower arm of the minimum phase is always on, there are no energizing patterns corresponding to the energizing patterns between time points T0 and T1 and between time points T6 and T7 shown in FIG. 4. However, it is nevertheless possible to detect the current of the maximum phase and the current of the minimum phase by detecting the bus current in the energizing patterns between time points T1 and T2 and between time points T2 and T3.

Note 2

Any of the different specified values (such as $i_\gamma^*$, $i_\delta^*$, $v_\gamma^*$, and $v_\delta^*$) and state quantities (such as $i_\gamma$ and $i_\delta$) mentioned above, that is, any value that needs to be derived as necessary may be derived in any manner. That is, such values may be derived, for example, through calculation performed within the controller 3, or may be derived from a previously set table data.

Note 3

Part or all of the functions of the controller 3 shown in FIG. 1, for example, is realized, for example, with software (program) incorporated in a general-purpose microcomputer or the like. When the controller 3 is realized with software, the block diagrams showing the configurations of different parts of the controller 3 serve as functional block diagrams. Needless to say, the controller 3 may be realized with hardware alone, instead of software (program), or may be realized with a combination of software and hardware.

Note 4

In the present specification, to make the description simple, state quantities and the like are often referred to by their symbols (such as $i_\gamma$) alone; for example, the "$\gamma$-axis current $i_\gamma$," is sometimes referred to simply by "$i_\gamma$," and these should be understood to represent the same thing.

The present invention is suitable for electric devices of any kind that use a motor; for example, it is suitable for electric cars that run by exploiting the rotation of a motor, compressors for use in refrigerators, and air-conditioning apparatuses (in particular, for example, in-vehicle air-conditioning apparatuses).

What is claimed is:

1. A motor control device, comprising:
a motor current detecting portion which detects, based on a current flowing between an inverter that drives a three-phase motor and a direct-current power supply, a motor current flowing through the motor;
a specified voltage value producing portion which produces, based on the motor current, a specified voltage value as a target value for a voltage to be applied to the motor, and which outputs the specified voltage value thus produced;
a specified voltage value holding portion which holds an earlier specified voltage value outputted from the specified voltage value producing portion; and
a specific period setting portion which sets a specific period based on a voltage difference between two of U-phase, V-phase, and W-phase voltages of the motor,
wherein, outside the specific period, the motor is controlled via the inverter based on the specified voltage value outputted from the specified voltage value producing portion, and, within the specific period, the motor is controlled via the inverter based on the specified voltage value held by the specified voltage value holding portion.

2. The motor control device of claim 1,
wherein the specific period setting portion includes, in the specific period, a period during which the voltage difference between two of U-phase, V-phase, and W-phase voltages is equal to or smaller than a predetermined threshold value.

3. The motor control device of claim 2,
wherein the inverter is provided with a pair of two switching elements, one pair for each of three phases, the pair of two switching elements being connected in series,
wherein the inverter drives the motor by performing switching control of each switching element based on the specified voltage value outputted from the specified voltage value producing portion or the specified voltage value held by the specified voltage value holding portion,
wherein, let the current flowing between the inverter and the direct-current power supply be called a current to be measured,
the motor current detecting portion detects the current to be measured by converting an analog signal commensurate with the current to be measured into a digital signal, and detects the motor current based on the current to be measured, and
the threshold value is previously set according to an attenuation time required for oscillation of the current to be measured to be attenuated, the oscillation occurring at a time of switching of each switching element.

4. The motor control device of claim 2,
wherein, let the current flowing between the inverter and the direct-current power supply be called a current to be measured,
the motor current detecting portion detects the current to be measured by converting an analog signal commensurate with the current to be measured into a digital signal, and detects the motor current based on the current to be measured, and
the threshold value is previously set according to a time required for the analog signal to be converted into the digital signal.

5. The motor control device of claim 2,
wherein the inverter is provided with a pair of two switching elements, one pair for each of three phases, the pair of two switching elements being connected in series,
wherein the inverter drives the motor by performing switching control of each switching element based on the specified voltage value outputted from the specified voltage value producing portion or the specified voltage value held by the specified voltage value holding portion,
wherein the threshold value is previously set according to a switching delay time of each switching element.

6. The motor control device of claim 1,
wherein the specified voltage value holding portion holds the specified voltage value outputted from the specified voltage value producing portion before the specific period.

7. The motor control device of claim 1,
wherein the specified voltage value comprises specified voltage values of two phases in rotating coordinates that rotate as a rotor of the motor rotates.

8. The motor control device of claim 7, further comprising:
an estimating portion which estimates a position of the rotor of the motor; and
a coordinate converting portion which converts the specified voltage values of two phases outputted from the specified voltage value producing portion or the specified voltage values of two phases held by the specified voltage value holding portion into specified three-phase voltage values based on the estimated position of the rotor,
wherein the motor control device controls the motor according to the specified three-phase voltage values,
wherein,
outside the specific period, the estimating portion estimates the position of the rotor based on the motor current,
within the specific period, the estimating portion stops estimating the position of the rotor based on the motor current, and estimates, based on the position of the rotor estimated before the specific period, the position of the rotor in the specific period in accordance with changes in the position of the rotor observed before the specific period or in accordance with rotation speed information of the motor obtained before the specific period.

9. The motor control device of claim 7, further comprising:
a position detecting portion which detects a position of the rotor of the motor by using a position sensor; and
a coordinate converting portion which converts the specified voltage values of two phases outputted from the specified voltage value producing portion or the specified voltage values of two phases held by the specified voltage value holding portion into specified three-phase voltage values based on the detected position of the rotor,
wherein the motor control device controls the motor according to the specified three-phase voltage values.

10. The motor control device of claim 1,
wherein the motor control device changes the U-phase, V-phase, and W-phase voltages in the specific period according to a position of a rotor of the motor.

11. A motor drive system, comprising:
a three-phase motor;
an inverter that drives the motor; and
the motor control device of claim 1, the motor control device controlling the motor by controlling the inverter.

* * * * *